US012159278B1

(12) United States Patent
Thomas et al.

(10) Patent No.: US 12,159,278 B1
(45) Date of Patent: Dec. 3, 2024

(54) VIRTUAL ASSET FREEZE

(71) Applicant: Wells Fargo Bank, N.A., San Francisco, CA (US)

(72) Inventors: Harrison Thomas, San Francisco, CA (US); Clynton Taylor, San Francisco, CA (US); Dennis E. Montenegro, Concord, CA (US); Jason Huang, San Francisco, CA (US); Anthony Stimola, San Francisco, CA (US); Raj Marwah, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 237 days.

(21) Appl. No.: 17/960,976

(22) Filed: Oct. 6, 2022

(51) Int. Cl.
*G06Q 20/38* (2012.01)
*G06Q 20/40* (2012.01)

(52) U.S. Cl.
CPC ..... *G06Q 20/3825* (2013.01); *G06Q 20/4015* (2020.05); *G06Q 20/4016* (2013.01); *G06Q 2220/00* (2013.01)

(58) Field of Classification Search
CPC .............................................. G06Q 20/00–425
See application file for complete search history.

(56) References Cited

U.S. PATENT DOCUMENTS

| 10,778,438 | B2 | 9/2020 | Shi et al. | |
| 2010/0269053 | A1 | 10/2010 | Lingafelt et al. | |
| 2020/0119917 | A1* | 4/2020 | Christensen | H04L 9/3239 |
| 2021/0165780 | A1 | 6/2021 | Shi et al. | |
| 2022/0122062 | A1 | 4/2022 | Mayblum et al. | |
| 2022/0383303 | A1* | 12/2022 | Mullen | G06Q 20/389 |

* cited by examiner

*Primary Examiner* — Mohammad A. Nilforoush
(74) *Attorney, Agent, or Firm* — Foley & Lardner LLP

(57) ABSTRACT

A method includes receiving an asset freeze service request having an authentication token by a service computing system from a user computing system. The method further includes retrieving a recorded user identifier and a recorded asset identifier by the service computing system from an asset control system that facilitates access of the virtual asset within a virtual environment. The method further includes comparing the user identifier with the recorded user identifier or the asset identifier with the recorded asset identifier by the service computing system. The method further includes the service computing system generating a key associated with the virtual asset and sending the key and the asset freeze service request to the asset control system. The method further includes service computing system generating an asset freeze protocol defining access to the virtual asset. The asset freeze protocol includes receiving a level one first trigger by the service computing system.

20 Claims, 9 Drawing Sheets

VIRTUAL ASSET FREEZE

TECHNICAL FIELD

The present implementations relate generally to freezing digital assets, and more particularly, to freezing virtual assets within a virtual environment.

BACKGROUND

Virtual assets for a virtual environment are typically available or accessible on the virtual environment without safeguards. Such lack of security of the virtual assets may increase the risk of theft and misappropriation of the virtual assets.

SUMMARY

Various arrangements related to a method that includes receiving an asset freeze service request by a service computing system from a user computing system. The asset freeze service request includes an authentication token having a user identifier associated with a user and an asset identifier associated with a virtual asset. The method further includes retrieving a recorded user identifier and a recorded asset identifier by the service computing system from an asset control system that facilitates access of the virtual asset within a virtual environment. The recorded user identifier is associated with the recorded asset identifier. The method further includes comparing the user identifier with the recorded user identifier or the asset identifier with the recorded asset identifier by the service computing system. The method further includes, based on the user identifier matching the recorded user identifier or the asset identifier matching the recorded asset identifier, the service computing system generating a key associated with the virtual asset. The method further includes the service computing system sending to the asset control system the key and the asset freeze service request. Based on receiving the key and the asset freeze service request, the asset control system requires the key to allow access to the virtual asset. Access to the virtual asset includes at least one of reading or viewing the virtual asset, copying the virtual asset, at least one of writing or editing the virtual asset, and at least one of selling or transferring the virtual asset. The method further includes the service computing system generating an asset freeze protocol configured to define access to the virtual asset. The asset freeze protocol includes the service computing system receiving a level one first trigger. The asset freeze protocol further includes, based on receiving the level one first trigger the service computing system securing the virtual asset under a level one freeze within the service computing system. The level one first trigger includes a detected action relating to at least one of the virtual environment or the virtual asset. The detected action is detected by at least one of the user computing system, the service computing system, the asset control system, and a user device. At the level one freeze, in response to determining that the user initiates at least one of selling or transferring the virtual asset within the asset control system, the service computing system prevents providing the key to the asset control system.

Various arrangements related to a system that includes a user computing device. The user computing is configured to send to a service computing system an asset freeze service request having an authentication token. The authentication token includes a user identifier associated with a user and an asset identifier associated with a virtual asset. The system further includes the service computing system. The service computing system is configured to retrieve a recorded user identifier and a recorded asset identifier from an asset control system configured to facilitate access of the virtual asset within a virtual environment. The recorded user identifier is associated with the recorded asset identifier. The service computing system is further configured to compare the user identifier with the recorded user identifier, or the asset identifier with the recorded asset identifier. The service computing system is further configured to, based on the user identifier matching the recorded user identifier or the asset identifier matching the recorded asset identifier, generate a key associated with the virtual asset. The service computing system is further configured to send the key and the asset freeze service request to the asset control system. The service computing system is further configured to generate an asset freeze protocol configured to define access to the virtual asset. The asset freeze protocol includes receiving a level one first trigger by the service computing system. The asset freeze protocol further includes, based on receiving the level one first trigger, the service computing system securing the virtual asset under a level one freeze within the service computing system. The level one first trigger includes a detected action relating to at least one of the virtual environment or the virtual asset. The detected action is detected by at least one of the user computing system, the service computing system, the asset control system, and a user device. At the level one freeze, in response to determining that the user initiates to at least one of sell or transfer the virtual asset within the asset control system, the service computing system prevents providing the key to the asset control system. The system further includes the asset control system. The asset control system is configured to, based on receiving the key and the asset freeze service request, require the key to allow access to the virtual asset. Access to the virtual asset includes at least one of reading or viewing the virtual asset, copying the virtual asset, at least one of writing or editing the virtual asset, and at least one of selling or transferring the virtual asset.

Various arrangements related to a non-transitory computer-readable storage media storing instructions that are executable by one or more processors to perform operations. The operations include receiving an asset freeze service request by a service computing system from a user computing system. The asset freeze service request includes an authentication token having a user identifier associated with a user and an asset identifier associated with a virtual asset. The operations further include retrieving a recorded user identifier and a recorded asset identifier by the service computing system from an asset control system that facilitates access of the virtual asset within a virtual environment. The recorded user identifier is associated with the recorded asset identifier. The operations further include comparing the user identifier with the recorded user identifier or the asset identifier with the recorded asset identifier by the service computing system. The operations further include, based on the user identifier matching the recorded user identifier or the asset identifier matching the recorded asset identifier, the service computing system generating a key associated with the virtual asset. The operations further include the service computing system sending to the asset control system the key and the asset freeze service request. The operations further include, based on receiving the key and the asset freeze service request, the asset control system requiring the key to allow access to the virtual asset. Access to the virtual asset includes at least one of reading or viewing the virtual asset, copying the virtual asset, at least one of writing or editing the virtual asset, and at least one of selling or transferring the virtual asset. The operations further include the service computing system generating an asset freeze protocol configured to define access to the virtual asset. The asset freeze protocol includes the service computing system receiving a level one first trigger. The asset freeze protocol further includes, based on receiving the level one first trigger the service computing system securing the virtual asset under a level one freeze within the service computing system. The level one first trigger includes a detected action relating to at least one of the virtual environment or the virtual asset. The detected action is detected by at least one of the user computing system, the service computing system, the asset control system, and a user device. At the level one freeze, in response to determining that the user initiates to at least one of sell or transfer the virtual asset within the asset control system, the service computing system prevents providing the key to the asset control system.

Figure 1:
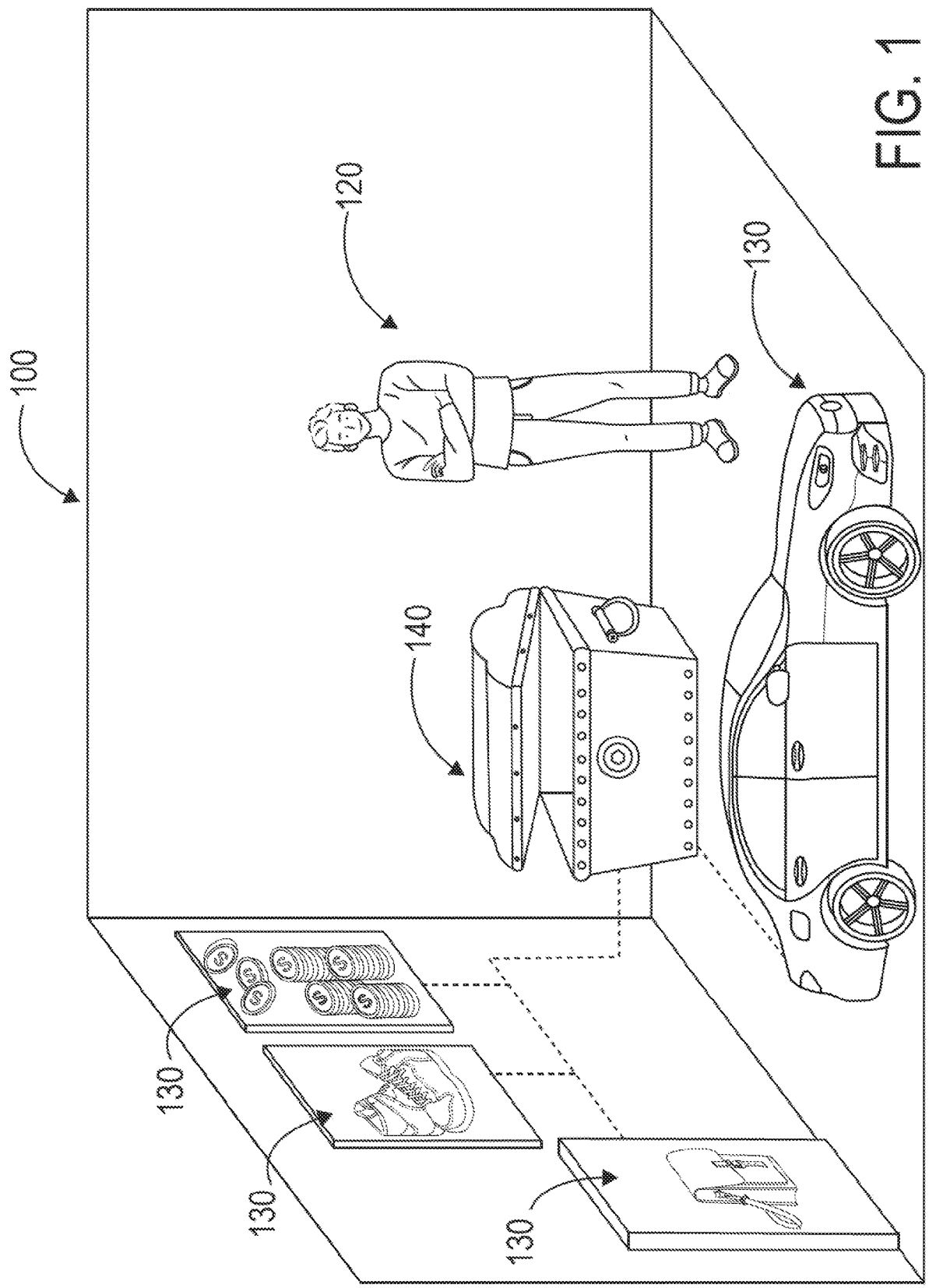
FIG. 1 is a virtual environment, according to some arrangements.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Referring to the figures generally, systems, apparatuses, and non-transitory computer-readable media and methods for freezing virtual assets in virtual environments are described herein. In some examples, virtual assets are frozen at different levels (e.g., freeze levels) based on factors including instructions of a user (e.g., client) who owns the virtual assets and/or instructions of a service provider who is responsible for managing and securing the virtual assets. Furthermore, the virtual assets may become frozen at the different levels based on a high risk event or triggers within or outside of the virtual environments, such as a delay in transfer of the virtual assets in the virtual environment between two users, a location of the user's avatar in the virtual environment being proximate to an avatar of a fraudulent user with fraudulent history, or a change in a market value of a virtual asset.

Referring to FIG. 1, a virtual environment 100 (e.g., a 3D space, a virtual world, a metaverse, etc.) is shown according to some arrangements. In some arrangements, the virtual environment 100 may be an Augmented Reality (AR), where non-interactive virtual elements are displayed and viewed with physical elements in a physical space (e.g., a physical world, a real world, a physical reality, etc.). In some arrangements, the virtual environment 100 may be a Virtual Reality (VR), where interactive virtual elements and the non-interactive virtual elements are displayed and viewed within a virtual space (e.g., a virtual world, a non-physical world, etc.). The interactive and the non-interactive virtual elements may graphically depict accurate or inaccurate representations of physical elements in the physical space. In some arrangements, the virtual environment 100 may be a mixed reality (MR), having a combination (e.g., a mix, etc.) of AR and VR, where the interactive and the non-interactive virtual elements are displayed and viewed with physical elements in a physical space. In some arrangements, the virtual environment 100 may be mapped to an outlined physical space (e.g., a room, a building, a city, a planet, etc.) such that virtual coordinates of the virtual environment 100 can be mapped or matched to (e.g., aligned with, become in-sync with, etc.) physical coordinates of the outlined physical space, for example, based on one or more matrices or transform functions that can convert physical coordinates to virtual coordinates, and vice versa.

The physical coordinates may be 2D (e.g., two-dimensional) in the physical space and can be defined by coordinates on a plane (e.g., on an x-y, x-z, or y-z plane) of the physical space. The virtual coordinates may be 2D in the virtual environment 100 and can be defined by coordinates on a plane (e.g., on an x-y, x-z, or y-z plane) in the virtual environment 100. The physical coordinates may be 3D (e.g., three-dimensional) in the physical space and can be defined by coordinates in a space (e.g., in an x-y-z space) of the physical space. The virtual coordinates may be 3D in the virtual environment 100 and can be defined by coordinates in a space (e.g., in an x-y-z space) of the virtual environment 100. A physical location of the user in the physical space can be represented by a point defined by a set of physical coordinates.

The virtual environment 100 includes an avatar 120 (e.g., an icon, a symbol, a figure, etc.). In some arrangements, the virtual environment 100 may include multiple avatars (each of which can be an avatar 120) for multiple users. The avatar 120 is configured to be a virtual or graphical representation of a user. For example, a representation of a human, an animal, a machine, a robot, an artificial intelligence system, etc. In some arrangements, the avatar 120 may include a realistic representation of one or more physical features of the user (e.g., a face, eyes, a nose, ears, hair, a head shape, a body shape, a skin color, etc.). In some arrangements, the avatar 120 includes an idealized or stylized representation of the one or more physical features of the user. For example, a blurry (e.g., pixilated, cloudy, fuzzy, foggy, cartoonized, etc.) representation of the one or more physical features of the user. In some arrangements, the avatar 120 does not include any representation of the user and can be a 2D or 3D graphical representation of another object. For example, the avatar 120 may be customizable by the user, such that the user may select at least one feature or aspect of the avatar 120. In these arrangements, the avatar 120 may be a living creature (e.g., a human, a dog, a horse, an alien, etc.), an imaginary living creature (e.g., a Santa Claus, a tooth fairy, etc.), or a non-living object (e.g., a chair, a car, a house, etc.). The virtual location of the avatar 120 in the virtual environment 100 can be represented by a point defined by a set of virtual coordinates. In some arrangements, the virtual location (e.g., the virtual coordinates defining the virtual location) can be set by the user using a user device. In some arrangements, a virtual position can be mapped to a physical position by mapping a point defined by a set of virtual coordinates in the virtual environment 100 to a point defined by a set of physical coordinates. In some arrangements, the avatar 120 may be shown to include a volume and a surface area in the virtual environment 100.

The user can control the avatar 120 and its activities within the virtual environment and view the virtual environment using the user device within the physical space. In some arrangements, the user device may be one or more of a headset (e.g., an AR goggle/glasses, a VR goggle/glasses, etc.), a phone, a tablet, a motion-tracking suit, a hologram system, a haptic glove, a controller, a haptic feedback olfactory device, sensors, cameras, and so on. The user device may be configured to receive input from the user. For example, the user device may detect movement (e.g., a body gesture, a facial expression, etc.) of the user, a voice command (e.g., talking, a verbal instruction, etc.) of the user, a geographic location of the user within the physical space, or the like, as input. The user device may be configured to output feedback to the user based on the input from the user. For example, the feedback may be visually presented to the user via a display, audibly presented to the user via a speaker (e.g., headphones, earphones, television speakers, studio speakers, etc.), haptically presented to the user via an actuator (e.g., an eccentric rotating mass (ERM) actuator, a linear resonant actuator (LRA), a piezoelectric actuator, etc.), a motor, a servomotor, an air vortex ring, an ultrasound transducer, etc., olfactorily presented to the user via a scent-generating device, or gustatorily presented to the user via a taste-generating device (e.g., a taste simulator, etc.).

In some arrangements, the user device and/or a backend processor providing the virtual environment 100 are configured to determine the virtual coordinates based on the physical coordinates using transformation matrices between the physical coordinates and the virtual coordinates, such that the user may control the avatar 120 within the virtual environment 100 by interacting with the user device (e.g., moving, talking, touching, pointing, speaking, etc.) within the outlined physical space. In these arrangements, the user device and/or the backend processor may create a dynamic spatial map of the outlined physical space which is then generated as actions or movements in the virtual environment 100. For example, the user device may detect actions (e.g., a body gesture, a voice command, a facial expression, etc.) of the user within the physical space that are defined by dynamic, changing physical coordinates, defined as action physical coordinates. The action physical coordinates may include physical coordinates of a hand of the user, a finger of the user, pupils of the user, a lip of the user, a tongue of the user, and so on, relative to the physical location or another point representing the user. Using transformation matrices, the user device and/or the backend processor may transform the action physical coordinates into dynamic, changing virtual coordinates, defined as action virtual coordinates. The action virtual coordinates may be used by the user device and/or the backend processor to duplicate, mirror, imitate, simulate, trigger, translate, or convert the actions of the user in the physical world to the actions of the avatar 120 within the virtual environment 100 relative to the virtual location or another point representing the avatar 120.

In some arrangements, multiple actions of the user defined by action physical coordinates may be detected by sensors of the user device in chronological order, such that the user device detects a sequence of actions of the user in the physical space. For example, the sequence of actions of the user in the physical space may be the user clapping their hands 4 times, the user jumping 7 times on one leg, the user falling down, or the like, that correspond to a pre-determined sequence of actions of the user in the physical space. Detecting a pre-determined sequence of actions of the user in the physical space that translates into a sequence of actions in the virtual environment 100 may be a trigger that initiates a pre-determined protocol in the virtual environment 100.

The virtual environment 100 may include one or more virtual assets 130. The virtual asset 130 may be a digital asset. For example, a non-fungible token (NFT), a cryptocurrency, a smart contract, a digital contract, an image, a movie, a Personal Identification Information (e.g., name, phone number, email address, etc.), a digital car title, a digital house title, a digital land title, patient data/information, hospital records, etc. In some examples, the virtual asset 130 may be a virtual representation of a physical asset. For example, a paper contract, a car, a car title, a house, a house title, a land, a land title, a watch, cash, a birth certificate, an identification card, physical hospital records, etc. The virtual asset 130 may be displayed in the virtual environment 100 in 2D or 3D as a virtual representation of the underlying asset (e.g., the digital asset or the physical asset). For example, a car may be displayed in the virtual environment 100 as a 2D or a 3D image. The virtual environment 100 may include multiple virtual assets 130 for multiple avatars 120. In some arrangements, all virtual assets 130 within the virtual environment 100 are accessible by all the avatars 120. In some arrangements, only some virtual assets 130 within the virtual environment 100 are accessible by all the avatars 120. In some arrangements, some virtual assets 130 within the virtual environment 100 are accessible by only some of the avatars 120. The avatar 120 may only be able to access virtual assets 130 that the user of the avatar 120 owns or possesses.

Figure 2:
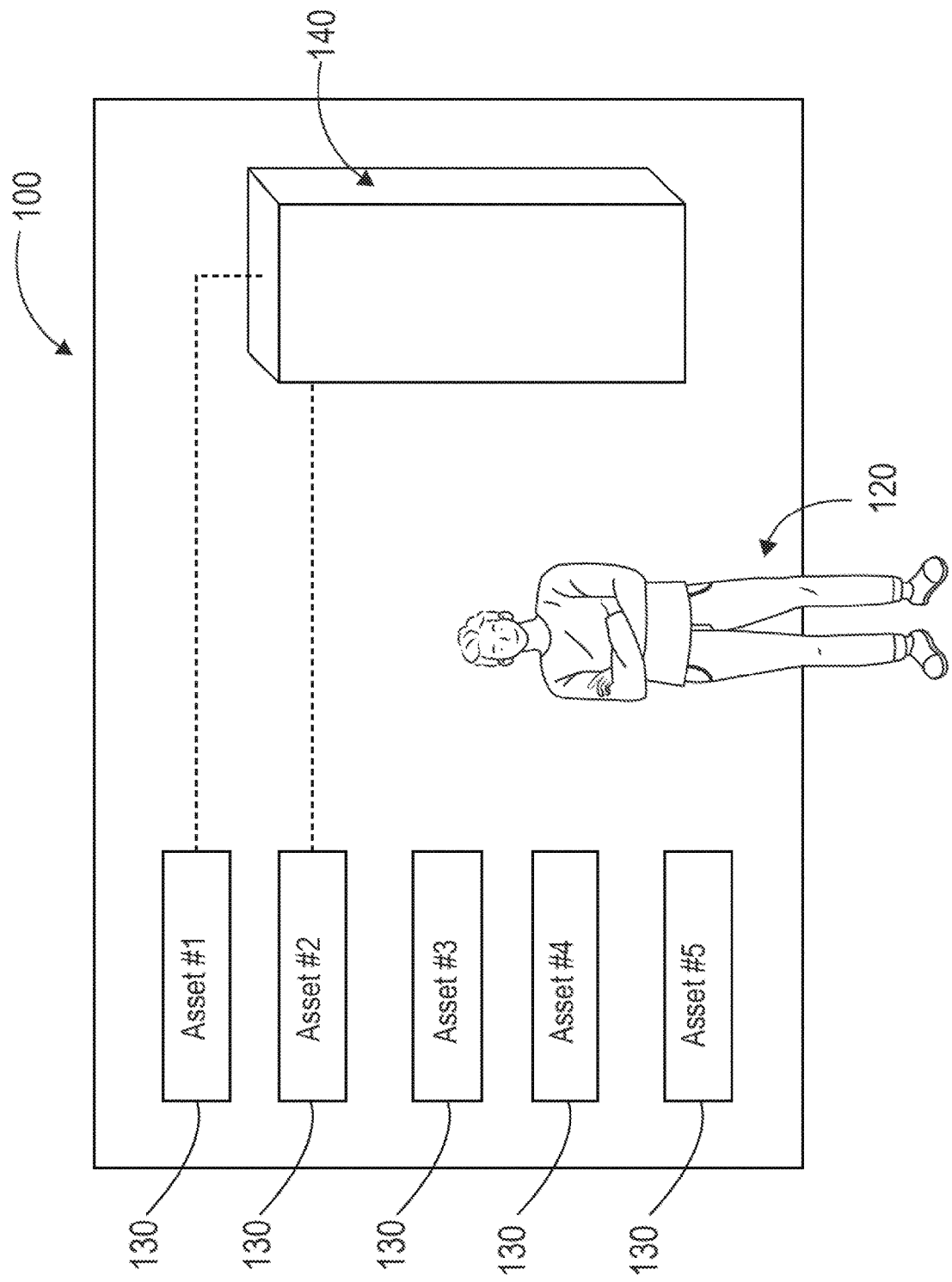
FIG. 2 is the virtual environment, according to some arrangements.

Referring to FIGS. 1 and 2, the virtual environment 100 may include a virtual vault 140 (e.g., a vault, a box, a jewelry box, a treasure box, a safety deposit box, a safe, etc.) displayed within the virtual environment 100. The virtual vault 140 is configured to limit accessibility of the virtual assets 130 virtually disposed within the virtual vault 140. Limiting accessibility of the virtual asset 130 reduces a risk of the virtual asset 130 being sold, transferred, read, viewed, copied, written, or edited to a full extent (e.g., fully, etc.) without the permission of the user, improving a security of the virtual asset 130. In some arrangements, the user may control the avatar 120 using the user device to place some or all of the virtual assets 130 into the virtual vault 140. In some arrangements, an action of the user detected by the user device may place some or all of the virtual assets 130 into the virtual vault 140. In some arrangements, an action relating to one or more of the virtual assets 130 may place some or all of the virtual assets 130 into the virtual vault 140.

In some arrangements, the user owns a user digital wallet (e.g., a virtual wallet, a blockchain wallet, a METAMASK®, a MathWallet®, an ALPHAWALLET®, a TRUST WALLET®, etc.) configured to contain one or more of the virtual assets 130. The user digital wallet may contain the virtual assets 130 by storing private keys associated with the virtual assets 130. Each of the private keys provides access to the virtual asset 130 it is associated with. The virtual vault 140 may be a digital representation of the virtual assets 130 in the user digital wallet. The virtual assets 130 contained in the user digital wallet may be contained within at least one of the virtual environment 100 or the virtual vault 140. The virtual assets 130 contained in the user digital wallet may be displayed in the virtual environment 100 or the virtual vault 140. The user digital wallet may be accessed by the user using the user device.

In some arrangements, the virtual vault 140 may occupy a particular space in the virtual environment 100. The virtual environment 100 shown in FIG. 1 may be a virtual depiction of an internal space of the virtual vault 140, where the virtual assets 130 owned by the user are displayed in the internal space along with the avatar 120. The virtual vault 140 may include 2D or 3D displays (e.g., heads up displays, etc.) that display the virtual asset 130. The virtual asset 130 may be categorized within the virtual vault 140 such that the internal space of the virtual vault 140 is divided among categories of the virtual assets 130. The internal space of the virtual vault 140 can be defined by virtual coordinates within the virtual environment 100, defined as internal virtual coordinates. The internal space of the virtual vault 140 and the virtual assets 130 within the virtual vault 140 may be visible to users of avatars other than the avatar 120. For example, users of avatars other than the avatar 120 may view and/or enter the internal virtual coordinates within the virtual environment 100. The user of the avatar 120 can grant permission to users of other avatars for being within the internal space of the virtual vault 140, view one or more or all of the virtual assets 130 within the virtual vault 140, interact with one or more or all of the virtual assets 130 within the virtual vault 140, and so on. The user may configure the virtual vault 140 to make only some virtual assets 130 visible to other avatars that are controlled by other users. For example, a first portion of the internal virtual coordinates, which encompasses the virtual coordinates of the virtual asset 130 that is visible to the users of other avatars, is visible to the users of other avatars in the virtual vault 140. A second portion of the internal virtual coordinates, which encompasses the virtual coordinates of the virtual asset 130 that is not visible (e.g., invisible, not shown, etc.) to the users of other avatars, is not visible (e.g., blurry, missing, blacked-out, etc.) to the users of other avatars in the virtual vault 140.

The virtual environment 100 may include one or more virtual walk-in-to-buy spaces. The virtual walk-in-to-buy spaces may be areas within the virtual environment 100. The virtual walk-in-to-buy spaces can be defined by virtual coordinates within the virtual environment 100, defined as walk-in virtual coordinates. In response to determining that the avatar 120 is entering or existing an area or a space defined by the walk-in virtual coordinates, the backend processor or a computing system charges the user of the avatar 120. Charging can be referred to sending a transaction request to the user digital wallet of the user for an amount associated with the virtual walk-in-to-buy spaces. In some arrangements, one of the virtual walk-in-to-buy spaces may be defined in response to the avatar 120 being within proximity to another avatar near an event (e.g., a concert, a movie, etc.) or an experience (e.g., skydiving, a boat ride, etc.) in the virtual environment 100. The avatar 120 being proximate to another avatar may be defined as the virtual coordinates of the avatar 120 being within a certain distance of the virtual coordinates of the other avatar. In some arrangements, the certain distance is between 1 to 10 times a length of the avatar 120 in the virtual environment 100. The user of the avatar 120 may be charged without a confirmation from or prior notice of the user of the avatar 120. The virtual walk-in-to-buy spaces may be defined within a smart contract presented to the user or the avatar 120 in response to joining or entering the virtual environment 100 or a portion of the virtual environment 100. The virtual walk-in-to-buy spaces can reduce time delay caused by conducting transactions. For example, a virtual trip on a virtual boat within the virtual environment 100, where the virtual boat is one of the virtual walk-in-to-buy spaces, may start immediately or approximately immediately after the avatar 120 enters the virtual boat.

Figure 3:
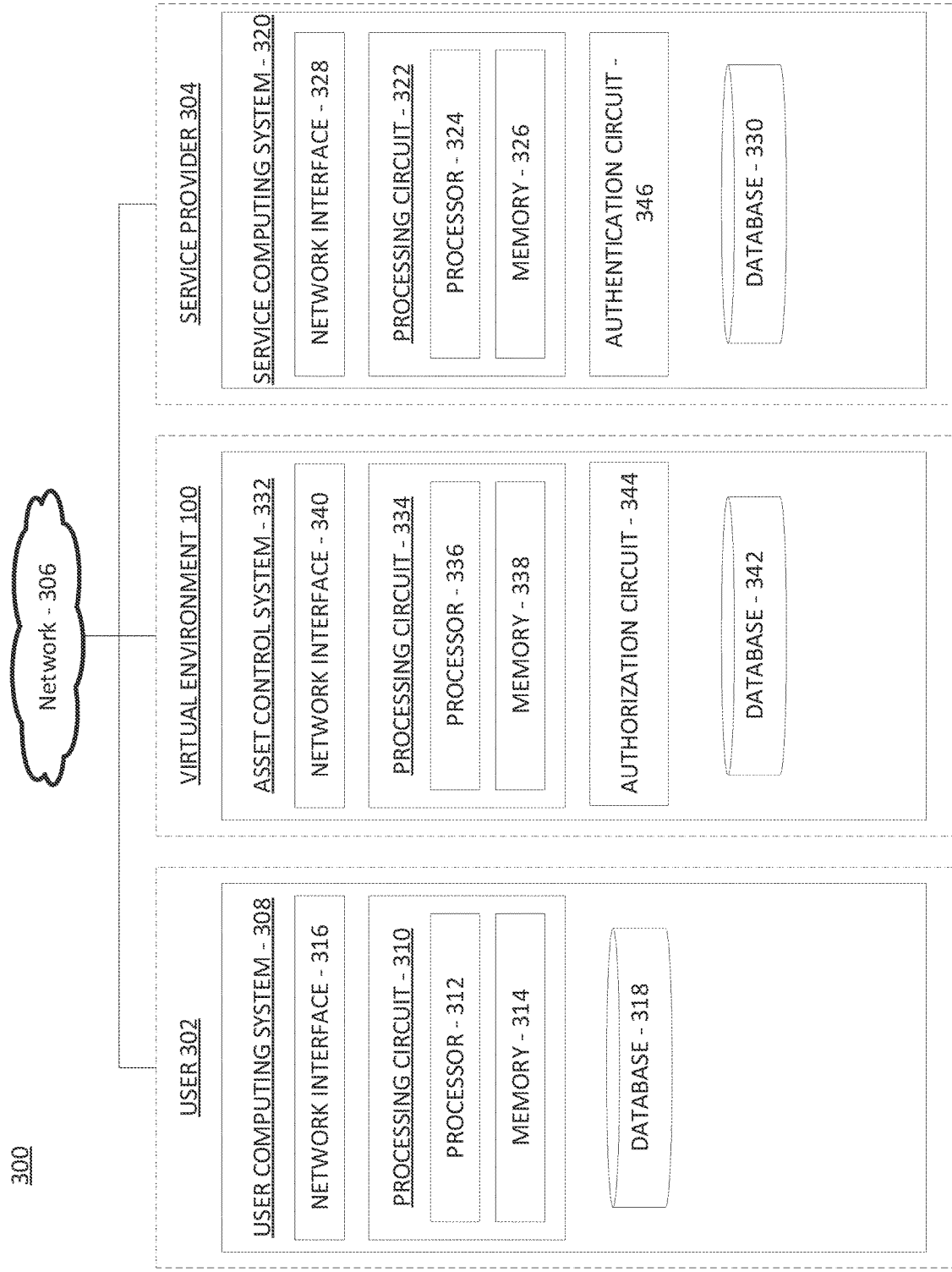
FIG. 3 is a system capable of implementing virtual asset freeze in a virtual environment, according to some arrangements.

Referring to FIG. 3, a system 300 is shown according to some arrangements. As described in further detail below, the system 300 facilitates communication between a user 302, a service provider 304, and the virtual environment 100 relating at least to limiting accessibility of virtual assets 130 of the user 302 within the virtual environment 100. In some arrangements, the system 300 is a computing environment having one or more computing systems. In some arrangements, the system 300 is a single computing system having one or more sub-systems within. In some arrangements, the system 300 is only the single computing system. In some arrangements, the service provider 304 may be a financial institution.

The system 300 includes a network 306. The network 306 may be any type or form of network. The geographical scope of the network 306 may vary widely. The network 306 may be a body area network (BAN), a personal area network (PAN), a local-area network (LAN) (e.g., Intranet, etc.), a metropolitan area network (MAN), a wide area network (WAN), or Internet. The topology of the network 306 may be of any form and may include any of the following: point-to-point, bus, star, ring, mesh, or tree. The network 306 may be an overlay network, which is virtual and sits on top of one or more layers of other networks 306. The network 306 may be of any such network topology as known to those ordinarily skilled in the art capable of supporting the operations described herein. The network 306 may utilize different techniques and layers or stacks of protocols, including an Ethernet protocol, an internet protocol suite (TCP/IP), an ATM (Asynchronous Transfer Mode) technique, an SONET (Synchronous Optical Networking) protocol, or a SDH (Synchronous Digital Hierarchy) protocol. The TCP/IP internet protocol suite may include an application layer, a transport layer, or an internet layer (including, e.g., IPv6), or the link layer. The network 306 may be a type of a broadcast network, a telecommunications network, a data communication network, or a computer network.

The system 300 includes a user computing system 308 (e.g., a processing system, etc.), an example of which is the user device as described herein. The user computing system 308 is configured to be utilized by the user 302 to at least communicate with other computing systems of the system 300. The user computing system 308 includes a processing circuit 310 having a processor 312 and memory 314. The processor 312 may be implemented as a general-purpose processor, an application specific integrated circuit (ASIC), one or more field programmable gate arrays (FPGAs), a digital signal processor (DSP), a group of processing components, or other suitable electronic processing components.

The memory 314 includes one or more memory devices (e.g., RAM, NVRAM, ROM, Flash Memory, hard disk storage, etc.) that store data and/or computer code for facilitating the various processes described herein. Moreover, the memory 314 may be or include tangible, non-transient volatile memory or non-volatile memory. Accordingly, the memory 314 may include database components, object code components, script components, or any other type of information.

The user computing system 308 further includes a network interface 316. The network interface 316 may link the user computing system 308 with one or more of the network 306 and other computing systems of the system 300 by one or more communication interfaces. A communication interface can include, for example, an application programming interface ("API") compatible with a particular component of the user computing system 308 or user computing system 308. The communication interface can provide a particular communication protocol compatible with a particular component of the user computing system 308 and a particular component/computing system of the system 300. The network interface 316 may be compatible with particular content objects, and may be compatible with particular content delivery systems corresponding to particular content objects. For example, the network interface 316 may be compatible with transmission of video content, audio content, or any combination thereof. For example, the network interface 316 may be compatible with payment processing transmissions by a protocol compatible with payment processing latency and encryption.

The user computing system 308 further includes a database 318. The database 318 is configured to store data associated with the user 302 and/or the user computing system 308. The database 318 may include one or more hardware memory devices to store binary data, digital data, or the like. The database 318 may include one or more electrical components, electronic components, programmable electronic components, reprogrammable electronic components, integrated circuits, semiconductor devices, flip flops, arithmetic units, or the like. The database 318 may include at least one of a non-volatile memory device, a solid-state memory device, a flash memory device, and a NAND memory device. The database 318 may include one or more addressable memory regions disposed on one or more physical memory arrays. A physical memory array may include a NAND gate array disposed on, for example, at least one of a particular semiconductor device, integrated circuit device, and printed circuit board device. While the database 318 is shown as part of the user computing system 308, the database 318 can be external to the user computing system 308 and communicably coupled to the user computing system 308 via the network 306.

The database 318 may store one or more user identifiers associated with the user 302. The user identifiers are configured to include information that identifies the user 302. In some arrangements, the user identifier may include biometric data (e.g., DNA, fingerprints, facial patterns, voice characteristics, etc.), a social media account, an account number, a decentralized identifier (DID) (e.g., a pseudo-anonymous identifier, etc.), a house address, a business address, a SSN, a driver license number, an identification card number, a passport number, or the like. In some arrangements, the user identifier may include an Internet Protocol (IP) address of the user computing system 308 or the user device, a Media Access Control (MAC) address of the user computing system 308 or the user device, a serial number of the user computing system 308 or the user device, or the like. The database 318 may also store one or more asset identifiers associated with the virtual asset 130. The asset identifiers are configured to include information that identifies the virtual asset 130. In some arrangements, the recorded asset identifier may include a type of asset (e.g., a virtual asset, a virtual representation of a physical asset, etc.), a category of asset (e.g., an image, a video, an audio, a game, an experience, a ticket, a cryptocurrency, a property, etc.), a wallet address, a token, a cryptographic hash (e.g., a transaction hash, etc.), an asset market value, an asset transaction (e.g., selling, transferring, minting, etc.) history (e.g., identity of minter, seller, buyer, and/or owner, timestamp of sale, transfer, or mint, etc.), or the like.

The system 300 further includes a service computing system 320. The service computing system 320 is configured to be utilized by the service provider 304 to at least communicate with other computing systems of the system 300 (e.g., the user computing system 308, etc.). The service computing system 320 includes a processing circuit 322 having a processor 324 and memory 326. Similar to the processor 312 of the user computing system 308, the processor 324 of the service computing system 320 may be implemented as the general-purpose processor, the ASIC, the one or more FPGAs, the DSP, the group of processing components, or other suitable electronic processing components. Similar to the memory 314 of the user computing system 308, the memory 326 of the service computing system 320 includes one or more memory devices that store data and/or computer code for facilitating the various processes described herein. Moreover, the memory 326 may be or include tangible, non-transient volatile memory or non-volatile memory. Accordingly, the memory 326 may include database components, object code components, script components, or any other type of information.

The service computing system 320 further includes a network interface 328. The network interface 328 may link the service computing system 320 with one or more of the network 306 and other computing systems of the system 300 (e.g., the user computing system 308, etc.) by one or more communication interfaces. The communication interface can include, for example, an API compatible with a particular component of the service computing system 320 or service computing system 320. The communication interface can provide a particular communication protocol compatible with a particular component of the service computing system 320 and a particular component/computing system of the system 300. Similar to the network interface 316 of the user computing system 308, the network interface 328 of the service computing system 320 may be compatible with particular content objects, and may be compatible with particular content delivery systems corresponding to particular content objects. For example, the network interface 328 may be compatible with transmission of video content, audio content, or any combination thereof. For example, the network interface 328 may be compatible with payment processing transmissions by a protocol compatible with payment processing latency and encryption.

The service computing system 320 further includes a database 330. The database 330 is configured to store data associated with the service provider 304 and/or the service computing system 320. Similar to the database 318 of the user computing system 308, the database 330 of the service computing system 320 may include one or more hardware memory devices to store binary data, digital data, or the like. The database 330 may include one or more electrical components, electronic components, programmable electronic components, reprogrammable electronic components, integrated circuits, semiconductor devices, flip flops, arithmetic units, or the like. The database 330 may include at least one of the non-volatile memory device, the solid-state memory device, the flash memory device, and the NAND memory device. The database 330 may include one or more addressable memory regions disposed on one or more physical memory arrays. A physical memory array may include a NAND gate array disposed on, for example, at least one of a particular semiconductor device, integrated circuit device, and printed circuit board device.

The system 300 further includes an asset control system 332. The asset control system 332 is configured to be utilized by the virtual environment 100 to at least communicate with other computing systems of the system 300 (e.g., the user computing system 308 and the service computing system 320). The asset control system 332 is also configured to facilitate access of the virtual asset 130 within the virtual environment 100. In some arrangements, the asset control system 332 may be, or be a part of, a blockchain, the user digital wallet, a database, a server, or the network 306. The asset control system 332 includes a processing circuit 334 having a processor 336 and memory 338. Similar to the processor 312 of the user computing system 308 and the processor 324 of the service computing system 320, the processor 336 of the asset control system 332 may be implemented as the general-purpose processor, the ASIC, the one or more FPGAs, the DSP, the group of processing components, or other suitable electronic processing components. Similar to the memory 314 of the user computing system 308 and the memory 326 of the service computing system 320, the memory 338 of the asset control system 332 includes one or more memory devices that store data and/or computer code for facilitating the various processes described herein. Moreover, the memory 338 may be or include tangible, non-transient volatile memory or non-volatile memory. Accordingly, the memory 338 may include database components, object code components, script components, or any other type of information.

The asset control system 332 further includes a network interface 340. The network interface 340 may link the asset control system 332 with one or more of the network 306 and other computing systems of the system 300 (e.g., the user computing system 308, the service computing system 320, etc.) by one or more communication interfaces. The communication interface can include, for example, an API compatible with a particular component of the asset control system 332 or the asset control system 332. The communication interface can provide a particular communication protocol compatible with a particular component of the asset control system 332 and a particular component/computing system of the system 300. Similar to the network interface 316 of the user computing system 308 and the network interface 328 of the service computing system 320, the network interface 340 of the asset control system 332 may be compatible with particular content objects, and may be compatible with particular content delivery systems corresponding to particular content objects. For example, the network interface 340 may be compatible with transmission of video content, audio content, or any combination thereof. For example, the network interface 340 may be compatible with payment processing transmissions by a protocol compatible with payment processing latency and encryption.

The asset control system 332 further includes a database 342. The database 342 is configured to store data associated with the virtual environment and/or the asset control system 332. Similar to the database 318 of the user computing system 308 and the database 330 of the service computing system 320, the database 342 of the asset control system 332 may include one or more hardware memory devices to store binary data, digital data, or the like. The database 342 may include one or more electrical components, electronic components, programmable electronic components, reprogrammable electronic components, integrated circuits, semiconductor devices, flip flops, arithmetic units, or the like. The database 342 may include at least one of the non-volatile memory device, the solid-state memory device, the flash memory device, and the NAND memory device. The database 342 may include one or more addressable memory regions disposed on one or more physical memory arrays. A physical memory array may include a NAND gate array disposed on, for example, at least one of a particular semiconductor device, integrated circuit device, and printed circuit board device.

The database 342 may store one or more recorded user identifiers associated with the user 302. The recorded user identifiers are configured to include information that identifies the user 302. The recorded user identifier may include implementations similar to the user identifier stored in the database 318 of the user computing system 308. The database 342 may also store one or more recorded asset identifiers associated with the virtual asset 130. The recorded asset identifiers are configured to include information that identifies the virtual asset 130. The recorded asset identifier may include implementations similar to the asset identifier stored in the database 318 of the user computing system 308. The database 342 may also store associations between the recorded user identifiers and the recorded asset identifiers. For example, a first recorded user identifier may be associated with a first recorded asset identifier. Furthermore, the first recorded user identifier may also be associated with a second recorded asset identifier. In some arrangements, the virtual assets 130 may be stored in a network database, where the network database is one or more of the databases 318, 342, and 330.

The asset control system 332 further includes an authorization circuit 344. The authorization circuit 344 is configured to authorize (e.g., approve, permit, allow, etc.) the user 302 to access the virtual asset 130. The authorization circuit 344 performs this authorization by receiving the user identifier and the asset identifier from the user computing system 308 over the network 306 and comparing (i) the user identifier with the recorded user identifier, or (ii) the asset identifier with the recorded asset identifier. In response to determining that the user identifier matches the recorded user identifier or the asset identifier matches the recorded asset identifier, the authorization circuit 344 transmits a positive authorization (e.g., matching, etc.) value to the processing circuit 334 of the asset control system 332, thus permitting access for the user 302 to the virtual asset 130. In some arrangements, the authorization circuit 344 will provide a negative authentication value to the processing circuit 334 of the asset control system 332, in response to determining that the user identifier does not match the recorded user identifier or in response to determining that the asset identifier does not match the recorded asset identifier, thus denying access for the user 302 to the virtual asset 130.

The service computing system 320 further includes an authentication circuit 346. The authentication circuit 346 is configured to authenticate (e.g., verify, confirm, etc.) an identity of the user 302 with an identity of the virtual asset 130. The authentication circuit 346 performs this authentication by receiving the user identifier and the asset identifier from the user computing system 308 over the network 306, retrieving the recorded user identifier and the recorded asset identifier from the asset control system 332 over the network 306, and comparing (i) the user identifier with the recorded user identifier, or (ii) the asset identifier with the recorded asset identifier. In response to determining that the user identifier matches the recorded user identifier or the asset identifier matches the recorded asset identifier, the authentication circuit 346 transmits a positive authentication (e.g., matching, etc.) value to the processing circuit 322 of the service computing system 320, thus authenticating that the user 302 owns the virtual asset 130. In some arrangements, the authentication circuit 346 will provide a negative authentication value to the processing circuit 322 of the service computing system 320, in response to determining that the user identifier does not match the recorded user identifier or in response to determining that the asset identifier does not match the recorded asset identifier, thus failing to authenticate that the user 302 owns the virtual asset 130.

Figure 4:
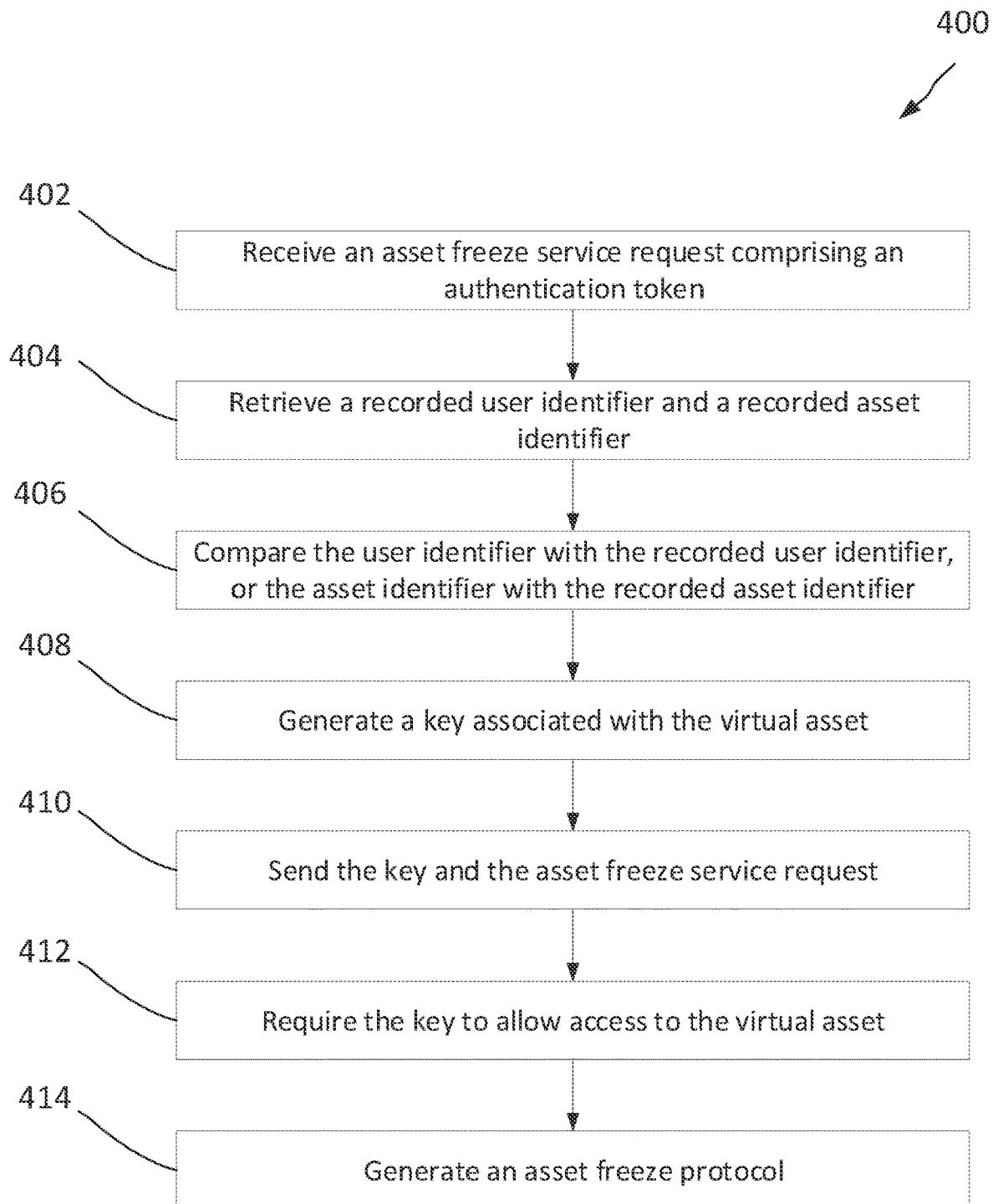
FIG. 4 is a flow diagram illustrating a method of processing an asset freeze service request, according to some arrangements.

Referring to FIG. 4, a flow diagram of a method 400 for processing an asset freeze service request is shown, according to some arrangements. The method 400 may be conducted by the system 300 (e.g., the service computing system 320, etc.). As shown, at 402, the service computing system 320 receives an asset freeze service request from the user computing system 308. The asset freeze service request is configured to seek an asset freeze service from the service computing system 320. The asset freeze service includes a protocol (e.g., an asset freeze protocol) configured to define a procedure for limiting accessibility of the virtual asset 130. The asset freeze service request may include an authentication token. The authentication token may include the user identifier and the asset identifier.

In some arrangements, the user 302 may claim ownership of the virtual asset 130 in response to the user 302 minting the virtual asset 130, purchasing the virtual asset 130 from a second user, or receiving the virtual asset 130 from the second user for free (e.g., a gift, a present, etc.) or non-monetary compensation (e.g., a trade, a favor, an exchange of good, etc.). The user 302 may claim ownership of the virtual asset 130 in response to the virtual asset 130 being added to the user digital wallet, which provides the user 302, via the user digital wallet, a private key to the virtual asset 130 that controls access to the virtual asset 130.

At 404, the service computing system 320 retrieves from the asset control system 332 the recorded user identifier and the recorded asset identifier, where the recorded user identifier is associated with the recorded asset identifier.

In some arrangements, the service computing system 320 may evaluate the user 302 and the virtual asset 130. For the user 302, the evaluation may include a review of one or more of a background check of the user 302, a credit score of the user 302, an occupation of the user 302, an income of the user 302, a house address of the user 302, or a business address of the user 302. For the virtual asset 130, the evaluation may include a review of one or more of a market value of the virtual asset 130, a storage medium of the virtual asset 130, a social media popularity of the virtual asset 130, a benefit of owning the virtual asset 130, a privilege of owning the virtual asset 130, or a feature of owning the virtual asset 130. The service computing system 320 may set a threshold for each category on which the user 302 and the virtual asset 130 are evaluated on. In some arrangements, the user 302 and the virtual asset 130 must be above all thresholds set by the service computing system 320 for the evaluation. In some arrangements, the user 302 and the virtual asset 130 must be above at least some (e.g., one or more) of all thresholds set by the service computing system 320 for the evaluation. In some arrangements, one of the user 302 or the virtual asset 130 must be above all thresholds set by the service computing system 320 for the evaluation. In some arrangements, one of the user 302 or the virtual asset 130 must be above at least some (e.g., one or more) of all thresholds set by the service computing system 320 for the evaluation. In these arrangements, in response to the user 302 and/or the virtual asset 130 not meeting requirements set by the evaluation of the service computing system 320, as discussed above, the service computing system 320 may deny the asset freeze service request from the user computing system 308 and terminate a remainder of the method 400.

At 406, the service computing system 320 compares the user identifier with the recorded user identifier or the asset identifier with the recorded asset identifier. At 408, based on the user identifier matching the recorded user identifier or the asset identifier matching the recorded asset identifier, the service computing system 320 generates a key (e.g., a second private key, a cryptographic authorization key, etc.) associated with the virtual asset 130. In some arrangements, in response to the service computing system 320 generating the key, the service computing system 320 also generates a smart contract (e.g., a smart agreement, etc.) that is binding to the user computing system 308 and the service computing system 320. In some arrangements, in response to the service computing system 320 generating the key, the service computing system 320 obtains access to the user digital wallet of the user 302, which includes the virtual asset 130. For example, the service computing system 320 may obtain a backup phrase (e.g., a seed phrase, a 12 or 24-word phrase, etc.) associated with the user digital wallet of the user 302, where the backup phrase provides complete access to the user digital wallet.

In some arrangements, the service computing system 320 may notify the user 302 via an alert (e.g., a notification, a pop-up message, a text message, an email, etc.) on the user computing system 308 or the user device that the identity of the user 302 was verified. The alert may also include a request for an approval from the user computing system 308 to continue before moving to 408 of generating the key. The alert may include a disclaimer informing the user 302 that access to the virtual asset 130 moving forward will require the key from the service computing system 320. In these arrangements, the method 400 may terminate in response to the user 302 denying the request for the approval to continue the method 400.

At 410, the service computing system 320 sends the key and the asset freeze service request to the asset control system 332. At 412, based on the asset control system 332 receiving the key and the asset service request from the service computing system 320, the authorization circuit 344 of the asset control system 332 requires the key to allow (e.g., enable, permit, etc.) the user 302 to access to the virtual asset 130. In some arrangements, access to the virtual asset 130 includes at least one of reading or viewing the virtual asset 130, copying the virtual asset 130, at least one of writing or editing the virtual asset 130, and at least one of selling or transferring the virtual asset 130. At 414, the service computing system 320 generates the asset freeze protocol, which is configured to define access to the virtual asset 130.

In some arrangements, the asset control system 332 may only allow an owner (e.g., the user 302, the service provider 304, etc.) or partial owners (e.g., users 302 or service providers 304 who own a portion, etc.) of the virtual asset 130 to control accessibility of the virtual asset 130. An owner of the virtual asset 130 has the virtual asset 130 in an owner digital wallet (e.g., the user digital wallet), which provides the owner, via the owner digital wallet, the private key to the virtual asset 130 that controls access to the virtual asset 130. Partial ownership (e.g., fractional ownership, etc.) of the virtual asset 130 fractionalizes (e.g., divides, etc.) the virtual asset 130, generating at least two portions of the virtual asset 130 that are linked to the virtual asset 130. Each of the at least two portions of the virtual asset 130 include a unique private key. The asset control system 332 may fractionalize the virtual asset 130 using a smart contract. A partial owner of the virtual asset 130 has one of the at least two portions of the virtual asset 130 in a partial owner digital wallet (e.g., the user digital wallet), which provides the partial owner, via the partial owner digital wallet, the private key to the one of the at least two portions of virtual asset 130 that controls access to the one of the at least two portions of the virtual asset 130. In these arrangements, in response to the authorization circuit 344 of the asset control system 332 requiring the key to allow the user 302 to access to the virtual asset 130, the service provider 304 becomes a partial owner of the virtual asset 130. Ownership of the service provider 304 in the virtual asset 130 may be very small (e.g., 0.1%, 0.01%, 0.001%, etc.), which may be detailed in the smart contract. The service provider 304 may interpret its ownership in the virtual asset 130 as compensation for the asset freeze service provided by the service computing system 320. In some arrangements, in response to the asset freeze service being terminated by the user 302 or the service provider 304, (i) the service provider 304 may retain (e.g., keep, etc.) partial ownership in the virtual asset 130, or (ii) the service provider 304 may lose partial ownership in the virtual asset 130. In further arrangements, partial ownership retention of the service provider 304 of the virtual asset 130 may be dependent on an identity of a party (e.g., the user 302 and service provider 304) who terminates the asset freeze service. For example, in response to the user 302 terminating the asset freeze service, the service provider 304 may retain partial ownership in the virtual asset 130, and in response to the service provider 304 terminating the asset freeze service, the service provider 304 may lose partial ownership in the virtual asset 130.

The database 318 of the user computing system 308 may store one or more first service provider identifiers associated with the service provider 304. The first service provider identifiers are configured to include information that identifies the service provider 304. The database 330 of the service computing system 320 may store one or more second service provider identifiers associated with the service provider 304. The second service provider identifiers are configured to include information that identifies the service provider 304. In some arrangements, the first and second service provider identifiers may include one or more of a business address of the service provider 304, a telephone number of the service provider 304, an email address of the service provider 304, a fax number of the service provider 304, a bank identifier code (BIC) of the service provider 304, an IP address of the service computing system 320, a MAC address of the service computing system 320, a serial number of the service computing system 320, or the like. The authentication token may include the first and second service provider identifiers. For example, the first service provider identifiers may be included in the authentication token from the database 318 of the user computing system 308 before the asset freeze service request is sent from the user computing system 308 to the service computing system 320, and the second service provider identifiers may be included in the authentication token from the database 330 of the service computing system 320 before the asset freeze service request is sent from the service computing system 320 to the asset control system 332. In these arrangements, the database 342 of the asset control system 332 may store one or more recorded service provider identifiers associated with the service provider 304. The recorded service provider identifiers are configured to include information that identifies the service provider 304. The recorded service provider identifiers may include implementations similar to the first service provider identifiers stored in the database 318 of the user computing system 308 and the second service provider identifiers stored in the database 330 of the service computing system 320.

In some arrangements, the asset control system 332 may verify the asset freeze service request by authenticating the user 302, the virtual asset 130, and the service provider 304. For example, the asset control system 332 may be configured to, based on at least receiving the asset freeze service request having the authentication token, (i) compare (a) the user identifier with the recorded user identifier, or (b) the asset identifier with the recorded asset identifier, and (ii) compare (a) the first service provider identifier with the second service provider identifier, or (b) the recorded service provider identifier with both the first service provider identifier with the second service provider identifier. In response to determining that (i) the user identifier matches the recorded user identifier or the asset identifier matches the recorded asset identifier, and (ii) the first service provider identifier matches the second service provider identifier or recorded service provider identifier matches both the first service provider identifier and the second service provider identifier, the authorization circuit 344 transmits a positive verification value to the processing circuit 334 of the asset control system 332, thus verifying the asset freeze service request. In some arrangements, the authorization circuit 344 will provide a negative verification value to the processing circuit 334 of the asset control system 332, in response to determining that (i) the user identifier does not match the recorded user identifier or the asset identifier does not match the recorded asset identifier, or (ii) the first service provider identifier does not match the second service provider identifier or recorded service provider identifier does not match both the first service provider identifier and the second service provider identifier. In some arrangements, in response to the negative verification value being provided to the processing circuit 334, the asset control system 332 does not accept the key and a remainder of the method 400 is terminated.

Figure 5:
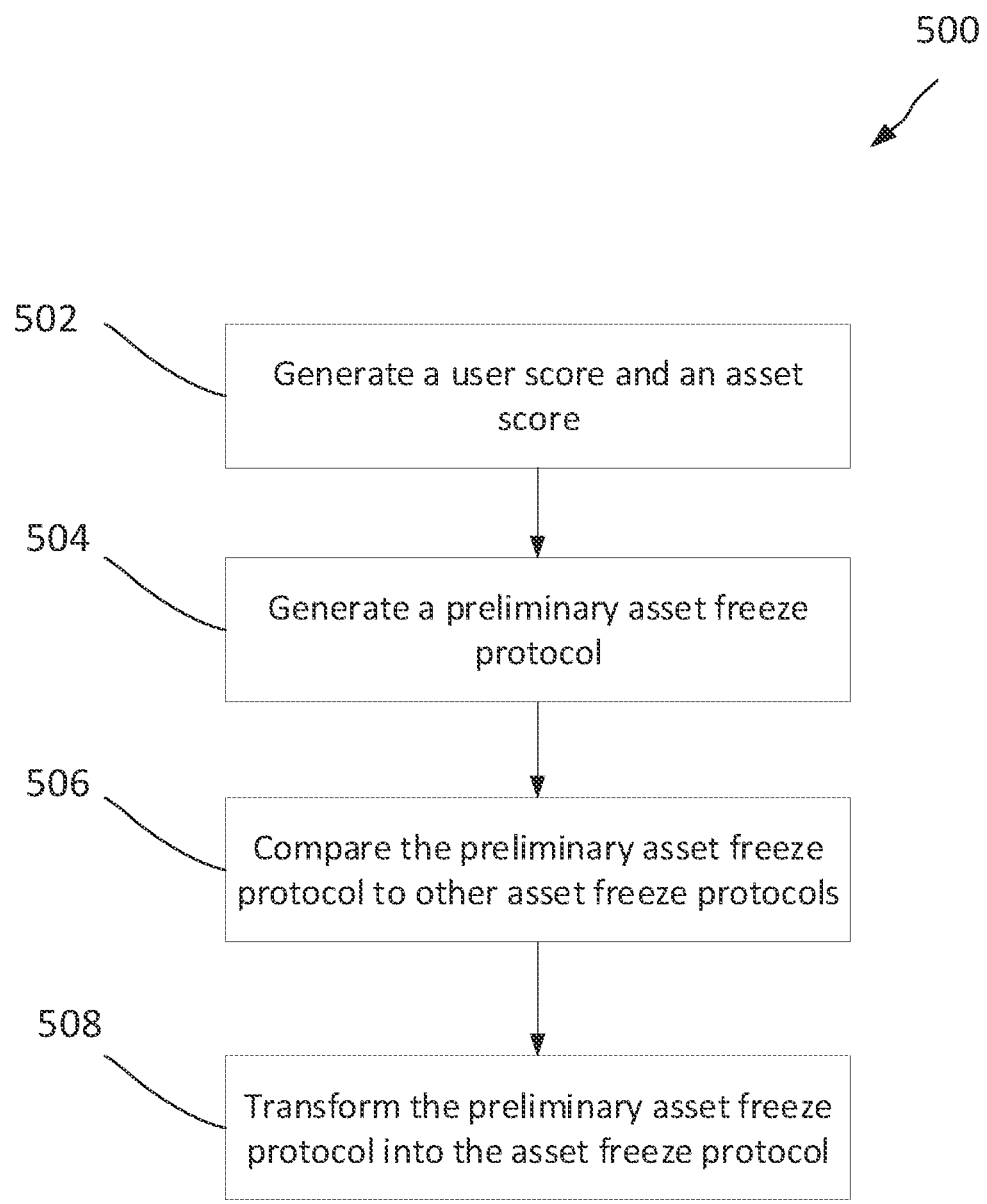
FIG. 5 is a flow diagram illustrating a method of generating an asset freeze protocol, according to some arrangements.

Referring to FIG. 5, a flow diagram of a method 500 for generating the asset freeze protocol is shown, according to some arrangements. Various operations of the method 500 may be conducted by the system 300 (e.g., the service computing system 320, etc.). As shown, at 502, the service computing system 320 generates a user score of the user 302 and an asset score of the virtual asset 130.

The user score may be based on at least one of an age of the user 302, a gender of the user 302, a credit score of the user 302, a house address of the user 302, a business address of the user 302, an occupation of the user 302, an income of the user 302, a household income of the user 302, or the like. In some arrangements, in response to the user score being based on a plurality of metrics (e.g., the age of the user 302, the gender of the user 302, etc.), the service computing system 320 may value one metric more than other metrics such that a proportion of the user score for the more valued metric is larger than all individual proportions of the user score of the other metrics.

The asset score of the virtual asset 130 may be based on at least one of a market value of the virtual asset 130, a storage medium of the virtual asset 130, a social media popularity of the virtual asset 130, a benefit of owning the virtual asset 130, a privilege of owning the virtual asset 130, a feature of owning the virtual asset 130, or the like. In some arrangements, in response to the asset score being based on a plurality of metrics (e.g., the market value of the virtual asset 130, the storage medium of the virtual asset 130, etc.), the service computing system 320 may value one metric more than other metrics such that a proportion of the asset score for the more valued metric is larger than all individual proportions of the asset score of the other metrics.

At 504, based on the user score and the asset score, the service computing system 320 generates a preliminary asset freeze protocol (e.g., a draft of the asset freeze protocol, etc.). At 506, the service computing system compares the preliminary asset freeze protocol to other asset freeze protocols (e.g., the asset freeze protocols for other users, etc.). The other asset freeze protocols correspond to (i) other users associated with other user scores equal to or approximately equal to the user score, and (ii) other assets associated with other asset scores equal to or approximately equal to the asset score. In some arrangements, the other user scores may be associated with the other asset scores. In some arrangements, the database 330 of the service computing system 320 may store the other asset freeze protocols. In some arrangements, the database 342 of the asset control system 332 may store the other asset freeze protocols. In some arrangements, a third-party database of a third-party may store the other asset freeze protocols. The third-party may be a data collection agency (e.g., a credit bureau, etc.), other service providers, other users, or the like.

At 508, based on the preliminary asset freeze protocol matching the other asset freeze protocols, the service computing system 320 transforms the preliminary asset freeze protocol into the asset freeze protocol.

Figure 6:
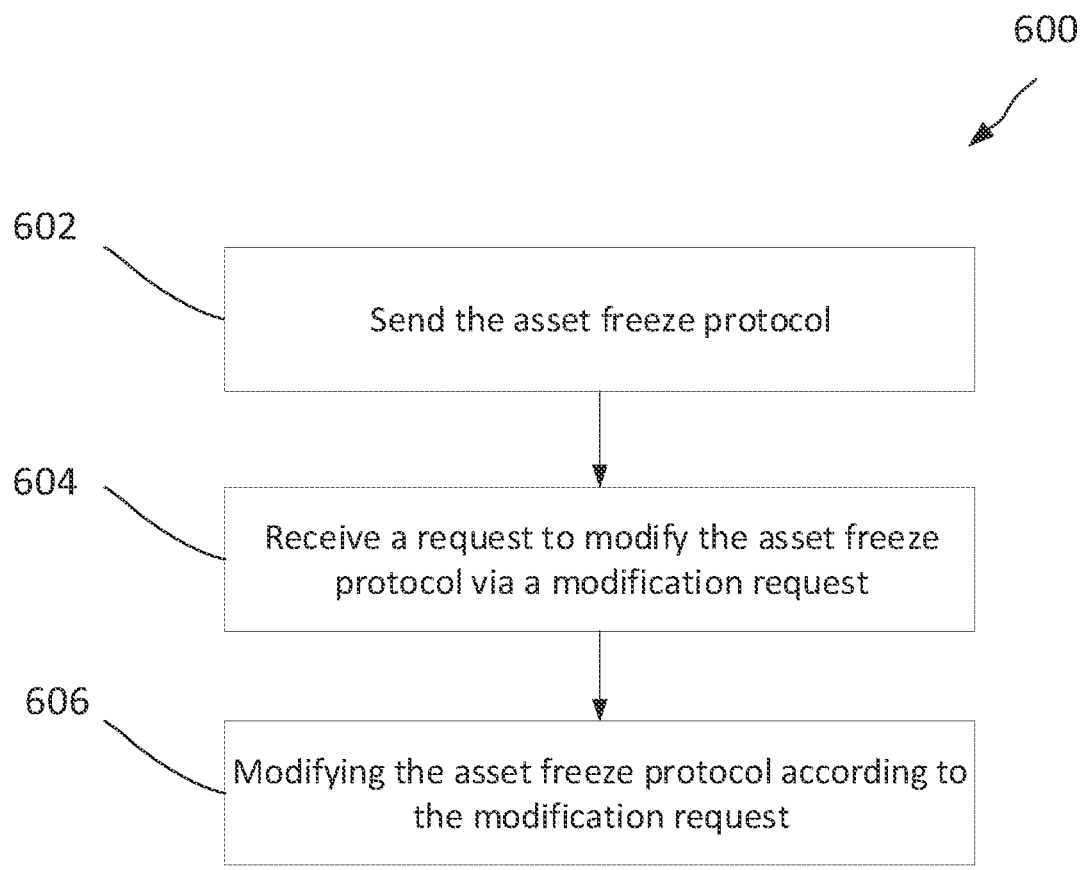
FIG. 6 is a flow diagram illustrating a method of modifying the asset freeze protocol, according to some arrangements.

Referring to FIG. 6, a flow diagram of a method 600 for modifying the asset freeze protocol is shown, according to some arrangements. Various operations of the method 600 may be conducted by the system 300 (e.g., the service computing system 320). As shown, at 602, the service computing system 320 sends the asset freeze protocol to the user computing system 308.

At 604, the service computing system 320 receives a request from the user computing system 308 to modify the asset freeze protocol via a modification request. In some arrangements, the modification request may include an additional trigger or an additional freeze level to be added to the asset freeze protocol. In some arrangements, the modification request may include a removal of a trigger or a freeze level from the asset freeze protocol.

At 606, based on the service computing system 320 receiving the modification request from the user computing system 308, the service computing system 320 modifies the asset freeze protocol according to the modification request. In some arrangements, the service computing system 320 may modify the preliminary asset freeze protocol based on the modification request and proceed with method 500. In these arrangements, only in response to the asset freeze protocol that was transformed from the modified preliminary asset freeze protocol matching the modified preliminary asset freeze protocol, the service computing system 320 modifies the asset freeze protocol according to the modification request.

Figure 7:
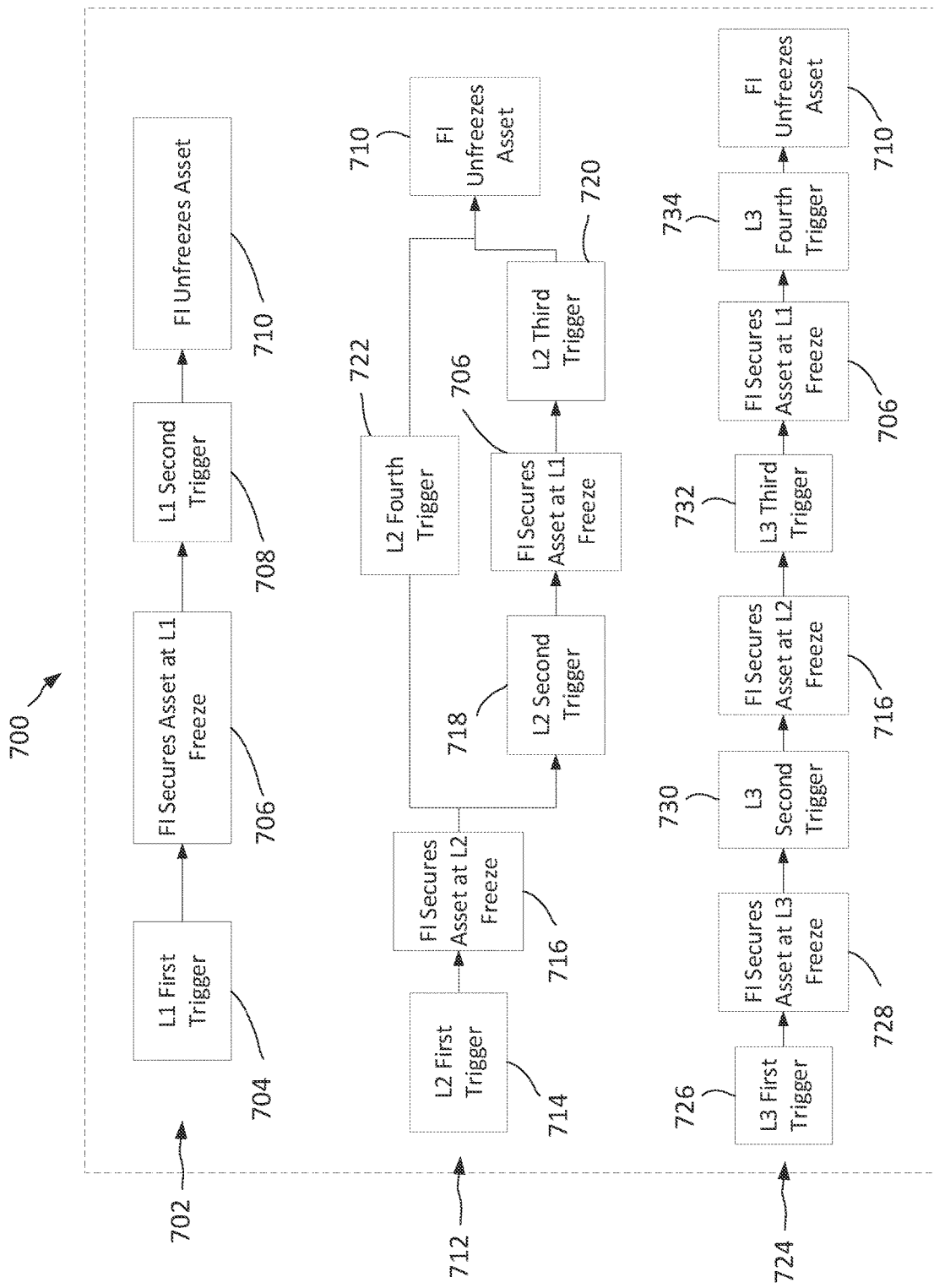
FIG. 7 is a diagram illustrating an asset freeze protocol, according to some arrangements.
Figure 8:
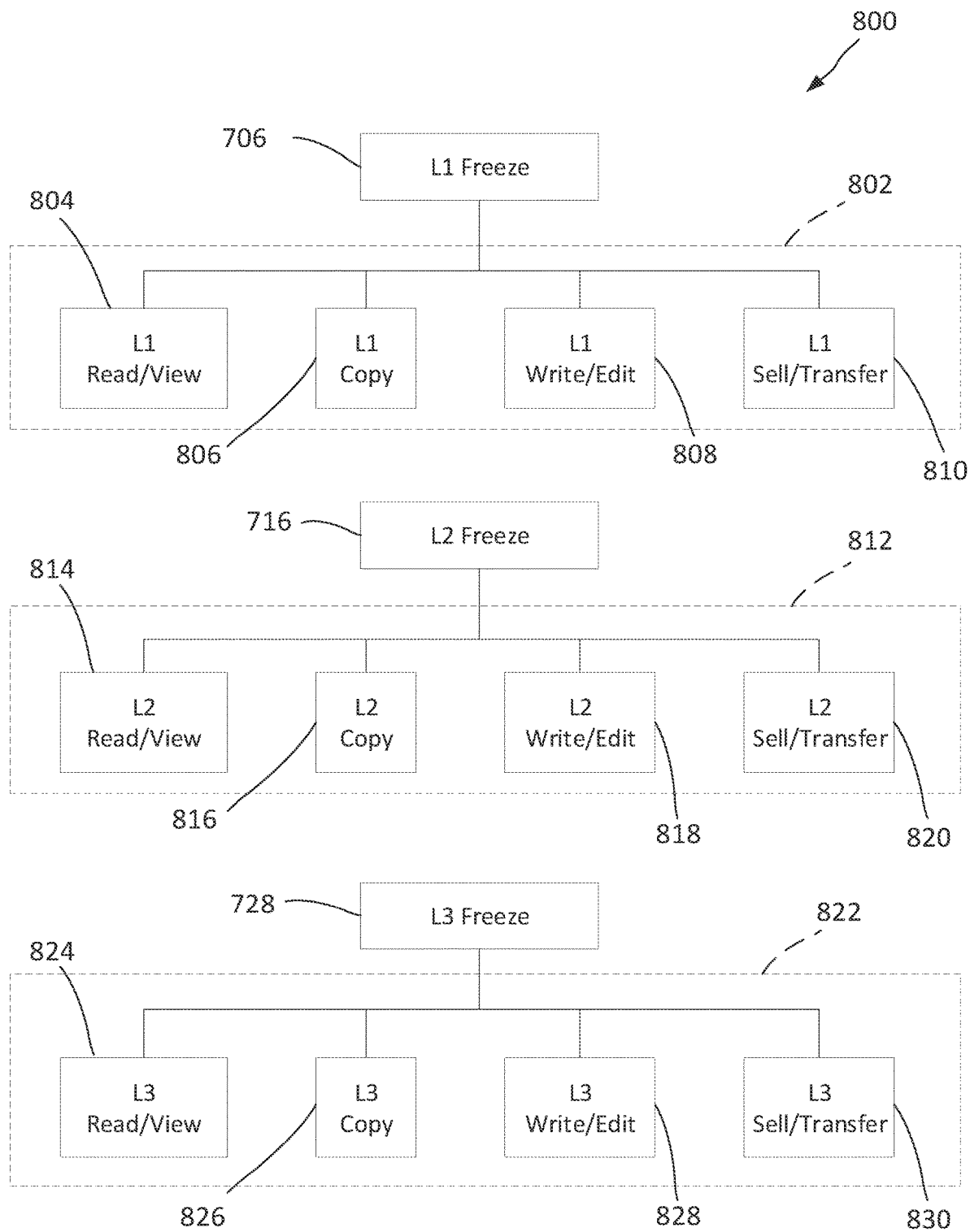
FIG. 8 is an access diagram, according to some arrangements.

Referring to FIG. 7, a diagram representing an example asset freeze protocol 700 is shown, according to some arrangements. Referring to FIG. 8, an access diagram 800 is shown, according to some arrangements. The asset freeze protocol 700 defines accessibility (e.g., access, etc.) to the virtual asset 130. The asset freeze protocol 700 includes or is defined by a plurality of triggers (e.g., initiators, flags, etc.). Each of the plurality of triggers includes a detected action relating to at least one of the virtual environment 100 or the virtual asset 130. The detected action is detected by at least one of the user computing system 308, the service computing system 320, the asset control system 332, the user device, or a service provider device. The service provider device is configured to be used (e.g., controlled, etc.) by the service provider 304 or a representative of the service provider 304. The service provider device may include similar implementations to that of the user device. The service provider device may be, or be a part of, the service computing system 320. The asset freeze protocol 700 further includes a plurality of freeze levels. Each of the plurality of freeze levels defining accessibility of the virtual asset 130 by the user 302 or other users. A selection of a freeze level from the plurality of freeze levels may be determined by the service computing system 320 based on a particular (e.g., select, unique, specific, etc.) trigger from the plurality of triggers.

The asset freeze protocol 700 includes a level one protocol 702. At the level one protocol 702, the service computing system 320 receives a level one (e.g., L1) first trigger 704 (e.g., one of the plurality of triggers). Based on receiving the level one first trigger 704, the service computing system 320 secures (e.g., freezes, etc.) the virtual asset 130 under a level one freeze 706 within the service computing system 320. The level one freeze 706 is configured to limit accessibility of the virtual asset 130 by the user 302 and/or other users.

The access diagram 800 represents access levels of the user 302 and/or other users to the virtual asset 130 based on the plurality of freeze levels. At the level one freeze 706, the user 302 is provided a level one access 802. The level one access 802 includes a level one read and/or view access 804, a level one copy access 806, a level one write and/or edit access 808, and a level one sell or transfer access 810. In some arrangements, the user 302 may have (i) full access to the virtual asset 130 in the level one read and/or view access 804, the level one copy access 806, and the level one write and/or edit access 808 and (ii) no access to the virtual asset 130 in the level one sell or transfer access 810. In these arrangements, at the level one freeze 706, the user 302 is (i) allowed by the service computing system 320 to at least one of read or view the virtual asset 130, copy the virtual asset 130, and at least one of write or edit the virtual asset 130, and (ii) prohibited by the service computing system to at least one of sell or transfer the virtual asset 130 within the asset control system 332. The service computing system 320 controls the accessibility of the user 302 to the virtual asset 130 by (i) providing the key to the asset control system 332 in response to the user 302 initiating, via the user computing system 308 or the user device, access the virtual asset 130 as allowed at the level one freeze 706 (e.g., at least one of read or view the virtual asset 130, etc.), and (ii) prevent providing the key to the asset control system 332 in response to the user 302 initiating, via the user computing system 308 or the user device, access the virtual asset 130 as prohibited at the level one freeze 706 (e.g., at least one of sell or transfer the virtual asset 130). The user 302 may initiate accessing the virtual asset 130 via the user device or the user computing system 308.

At the level one protocol 702, the service computing system 320 further receives a level one second trigger 708

(e.g., another one of the plurality of triggers). Based on receiving the level one second trigger 708, at 710, the service computing system 320 removes the virtual asset 130 from under the level one freeze 706 (e.g., unfreezes the virtual asset 130), thus providing the user 302 with full access to the virtual asset 130. Full access to the virtual asset 130 may include the user 302 at least one of reading or viewing the virtual asset 130, copying the virtual asset 130, at least one of writing or editing the virtual asset 130, and at least one of selling or transferring the virtual asset 130.

The asset freeze protocol 700 further includes a level two protocol 712. At the level two protocol 712, the service computing system 320 receives a level two (e.g., L2) first trigger 714 (e.g., yet another one of the plurality of triggers). Based on receiving the level two first trigger 714, the service computing system 320 secures the virtual asset 130 under a level two freeze 716 within the service computing system 320. The level two freeze 716 is configured to limit accessibility of the virtual asset 130 by the user 302 and/or other users.

At the level two freeze 716, the user 302 is provided a level two access 812. The level two access 812 includes a level two read and/or view access 814, a level two copy access 816, a level two write and/or edit access 818, and a level two sell or transfer access 820. In some arrangements, the user 302 may have (i) partial access to the virtual asset 130 in the level two read and/or view access 814, the level two copy access 816, and the level two write and/or edit access 818 and (ii) no access to the virtual asset 130 in the level two sell or transfer access 820. In these arrangements, at the level two freeze 716, the user 302 is (i) allowed by the service computing system 320 to at least one of read or view only a first portion the virtual asset 130, copy only a second portion of the virtual asset 130, and at least one of write or edit only a third portion of the virtual asset 130, and (ii) prohibited by the service computing system 320 to at least one of sell or transfer the virtual asset 130 within the asset control system 332. In some arrangements, the first portion of the virtual asset 130, the second portion of the virtual asset 130, and the third portion of the virtual asset 130 are all same portions of the virtual asset 130. In some arrangements, (i) only the first portion of the virtual asset 130 is same as the second portion of the virtual asset 130, (ii) only the first portion of the virtual asset 130 is same as the third portion of the virtual asset 130, or (iii) only the second portion of the virtual asset 130 is same as the third portion of the virtual asset 130. In some arrangements, the first portion of the virtual asset 130, the second portion of the virtual asset 130, and the third portion of the virtual asset 130 are all different portions of the virtual asset 130.

Similar to the level one freeze 706, at the level two freeze 716, the service computing system 320 controls the accessibility of the user 302 to the virtual asset 130 by (i) providing the key to the asset control system 332 in response to the user 302 initiating, via the user computing system 308 or the user device, access the virtual asset 130 as allowed at the level two freeze 716 (e.g., at least one of read or view only the first portion of the virtual asset 130, etc.), and (ii) prevent providing the key to the asset control system 332 in response to the user 302 initiating, via the user computing system 308 or the user device, access the virtual asset 130 as prohibited at the level two freeze 716 (e.g., at least one of sell or transfer the virtual asset 130).

In some arrangements, at the level two protocol 712, the service computing system 320 further receives a level two second trigger 718 (e.g., yet another one of the plurality of triggers). Based on receiving the level two second trigger 718, at 706, the service computing system 320 removes the virtual asset 130 from under the level two freeze 716 and secures the virtual asset 130 under the level one freeze 706 within the service computing system 320. At the level two protocol 712, the service computing system 320 further receives a level two third trigger 720 (e.g., yet another one of the plurality of triggers). Based on receiving the level two third trigger 720, at 710, the service computing system 320 removes the virtual asset 130 from under the level one freeze 706 (e.g., unfreezes the virtual asset 130), thus providing the user 302 with full access to the virtual asset 130.

In some arrangements, at the level two protocol 712, the service computing system 320 further receives a level two fourth trigger 722 (e.g., yet another one of the plurality of triggers). Based on receiving the level two fourth trigger 722, at 710, the service computing system 320 removes the virtual asset 130 from under the level two freeze 716 (e.g., unfreezes the virtual asset 130), thus providing the user 302 with full access to the virtual asset 130. In these arrangements, the virtual asset 130 is not moved (e.g., transferred, etc.) to the level one freeze 706.

The asset freeze protocol 700 further includes a level three protocol 724. At the level three protocol 724, the service computing system 320 receives a level three (e.g., L3) first trigger 726 (e.g., yet another one of the plurality of triggers). Based on receiving the level three first trigger 726, the service computing system 320 secures the virtual asset 130 under a level three freeze 728 within the service computing system 320. The level three freeze 728 is configured to limit accessibility of the virtual asset 130 by the user 302 and/or other users.

At the level three freeze 728, the user 302 is provided a level three access 822. The level three access 822 includes a level three read and/or view access 824, a level three copy access 826, a level three write and/or edit access 828, and a level three sell or transfer access 830. In some arrangements, the user 302 may have no access to the virtual asset 130 in the level three read and/or view access 824, the level three copy access 826, the level three write and/or edit access 828, and the level three sell or transfer access 830. In these arrangements, at the level three freeze 728, the user 302 is prohibited by the service computing system 320 to at least one of read or view the virtual asset 130, copy the virtual asset 130, at least one of write or edit the virtual asset 130, and at least one of sell or transfer the virtual asset 130 within the asset control system 332.

Similar to the level one freeze 706 and the level two freeze 716, at the level three freeze 728, the service computing system 320 controls the accessibility of the user 302 to the virtual asset 130 by (i) providing the key to the asset control system 332 in response the user 302 initiating, via the user computing system 308 or the user device, to access the virtual asset 130 as allowed at the level three freeze 728 (e.g., none), and (ii) prevent providing the key to the asset control system 332 in response to the user 302 initiating, via the user computing system 308 or the user device, to access the virtual asset 130 as prohibited at the level three freeze 728 (e.g., at least one of read or view the virtual asset 130, etc.).

At the level three protocol 724, the service computing system 320 further receives a level three second trigger 730 (e.g., yet another one of the plurality of triggers). Based on receiving the level three second trigger 730, at 716, the service computing system 320 removes the virtual asset 130 from under the level three freeze 728 and secures the virtual asset 130 under the level two freeze 716 within the service computing system 320. At the level three protocol 724, the service computing system 320 further receives a level three third trigger 732 (e.g., yet another one of the plurality of triggers). Based on receiving the level three third trigger 732, at 706, the service computing system 320 removes the virtual asset 130 from under the level two freeze 716 and secures the virtual asset 130 under the level one freeze 706 within the service computing system 320. At the level three protocol 724, the service computing system 320 further receives a level three fourth trigger 734 (e.g., yet another one of the plurality of triggers). Based receiving the level three fourth trigger 734, at 710, the service computing system 320 removes the virtual asset 130 from under the level one freeze 706 (e.g., unfreezes the virtual asset 130 thus providing the user 302 with full access to the virtual asset 130.

It is to be appreciated that the accessibilities of the user 302 and/or other users disclosed above with reference to the level one freeze 706, the level two freeze 716, and the level three freeze 728 are provided as examples and are not limiting. For example, at the level one freeze 706, the user 302 may be (i) allowed by the service computing system 320 to at least one of read or view the virtual asset 130, copy the virtual asset 130, and at least one of sell or transfer the virtual asset 130, and (ii) prohibited by the service computing system 320 to at least one of write or edit the virtual asset 130 within the asset control system 332. Additionally, it is to be appreciated that the asset freeze protocol 700 may include more freeze levels (e.g., a level four freeze, a level five freeze, etc.) or less freeze levels (e.g., only the level one freeze 706, only the level one freeze 706 and the level two freeze 716, etc.). Furthermore, it is to be appreciated that all arrangements and examples described herein for a particular level protocol (e.g., the level one protocol 702, the level two protocol 712, and the level three protocol 724) may be used for, or combined with, other particular level protocols.

In some arrangements, the service provider 304, or a third-party insurance institution, may provide an insurance on the virtual asset 130. The insurance would cover loss and/or theft of the virtual asset 130. For example, in response to the virtual asset 130 being lost by the user 302 or the service provider 304 or stolen from the user 302, the service provider 304 or the third-party insurance institution compensates the user 302. An insurance premium (e.g., a cost of insurance, etc.) may be inversely correlated to the access levels (e.g., the level one access 802, the level two access 812, and the level three access 822). For example, the insurance premium associated with the level one access 802 may be X dollars, the insurance premium associated with the level two access 812 may be Y dollars, and the insurance premium associated with the level three access 822 may be Z dollars, where X>Y>Z. In these arrangements, more restrictions provided by an access level may reduce a risk of loss or theft of the virtual asset 130, reducing a risk for the service provider 304, or the third-party insurance institution, of the virtual asset 130 being lost or stolen. While values of X, Y, and Z are described in dollars, it is to be appreciated that values for X, Y, and Z may be of any currency.

Figure 9:
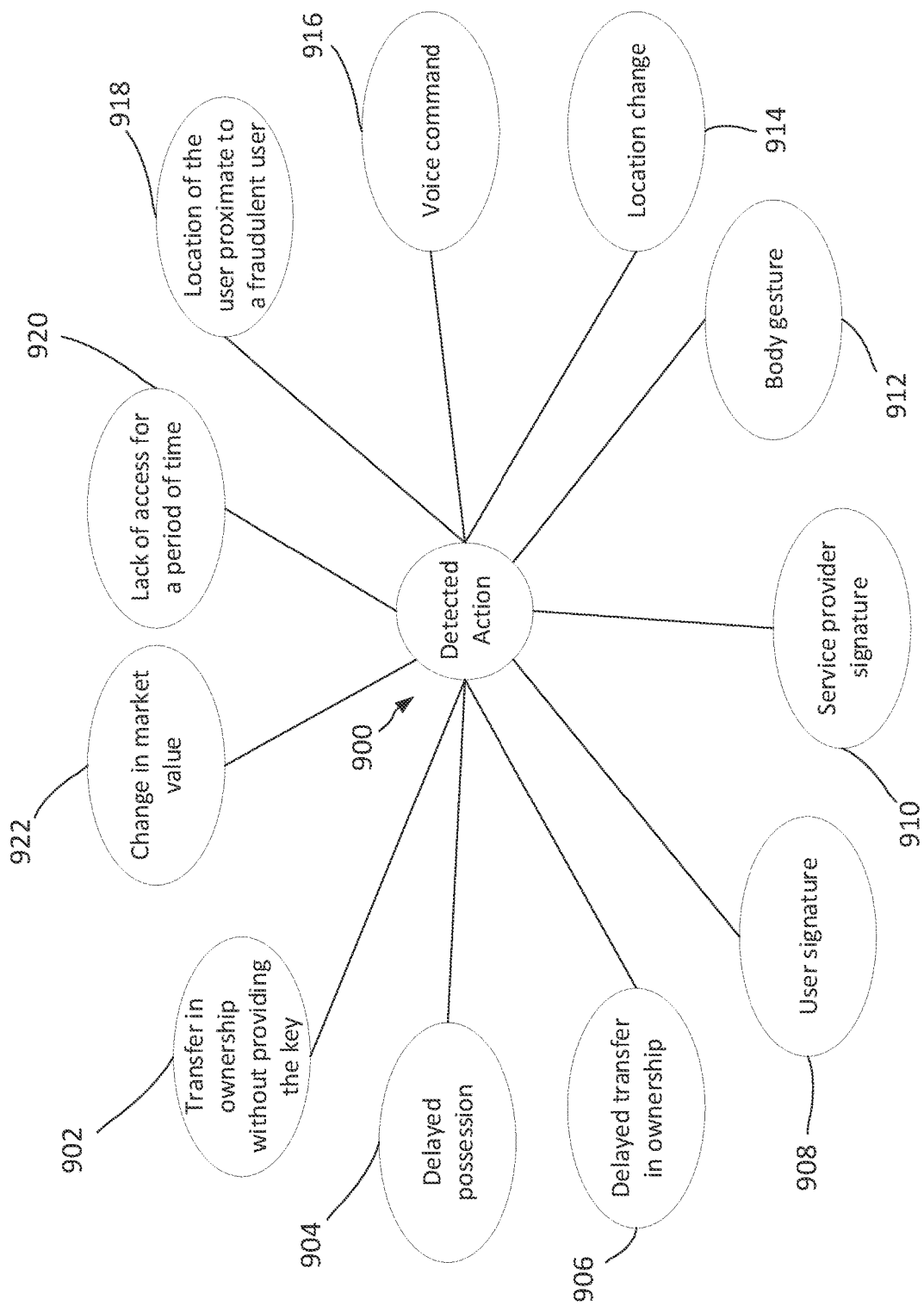
FIG. 9 is a detected actions diagram, according to some arrangements.

Referring to FIG. 9, detected actions 900 are shown, according to some arrangements. One or more of the detected actions 900 may be included in each of the plurality of triggers (e.g., the level one first trigger 704, the level two second trigger 718, etc.). The detected actions 900 relate to at least one of the virtual environment 100 or the virtual asset 130. FIG. 9 includes several detected actions 900. At 902, the asset control system 332 may detect a transfer in ownership of the virtual asset 130 from the user 302 to another user within the asset control system 332 without the service computing system 320 providing the key to the asset control system 332. At 904, the asset control system 332 may detect a delay in possession of the virtual asset 130 by the user 302 within the asset control system 332. At 906, the asset control system 332 may detect a delay in transfer of the virtual asset 130 from the user 302 to another user within the asset control system 332. At 908, the user device may detect a user signature including movement of the user 302. At 910, the service provider device may detect a service provider signature including movement of the representative of the service provider 304.

At 912, the user device may detect a body gesture of the user 302. The user 302 may hold on to a controller having sensors (e.g., the user device) and wave the controller in a pre-determined sequence. The pre-determined sequence may include pre-determined directions (e.g., up and down, left and right, etc.) of the controller, having physical coordinates in the physical space, at a pre-determined number of times (e.g., three times, four time, ten times, etc.). For example, the user 302 may jump with the controller five times, shake the controller three times, squeeze the controller ten times, and so on. The user 302 may make a pre-determined body-gesture visible to a camera (e.g., the user device) in the physical space. Using artificial intelligence, the user device determines whether body gestures of the user 302 captured by the camera correspond to the pre-determined body-gestures. For example, the pre-determined body-gesture may be the user 302 jumping five times in view of the camera, falling three times in view of the camera, sitting down ten times in view of the camera, and so on. In some arrangements, the user 302 may make the pre-determined body-gesture while wearing a motion-tracking suit in the physical space. The user device determines whether body gestures of the user 302 captured by the motion-tracking suit correspond to the pre-determined body-gestures. The pre-determined body-gestures may have been pre-recorded by the user 302 on the user device such that the user device can compare the body gestures captured with motion-tracking suit with the pre-recorded body gestures. In some arrangements, the user 302 may make the pre-determined body-gesture while holding a sensor (e.g., an accelerometer sensor, a vibration sensor, etc.) in the physical space. The user device determines whether body gestures of the user 302 captured by the sensor correspond to the pre-determined body-gestures. The pre-determined body-gestures may have been pre-recorded by the user 302 on the user device such that the user device can compare the body gestures captured with sensor with the pre-recorded body gestures.

At 914, the user device may detect a location change of the user 302 in the physical space based on a location change of the user device in the physical space. Using a Global Positioning System (GPS), Wi-Fi location tracking, cellular location tracking, Bluetooth location positioning, Radio Frequency Identification (RFID) tracking, or the like, the user device may detect the location of the user device within the physical coordinates of the physical space, thus determining the location of the user 302 within the physical coordinates of the physical space. For example, an insecure location, having physical coordinates within the physical space defined as insecure physical coordinates, may have been identified by the service computing system 320 to have an unprotected (e.g., insecure, etc.) internet connection. At 914, the user device may detect the location of the user 302 in the physical space being proximate to or within the insecure physical coordinates based on the location of the user device within the physical space being proximate to or within the insecure physical coordinates. For example, the service computing system 320 may have set a pre-determined physical radius having safe physical coordinates within the physical space. At 914, the user device may detect the location of the user 302 in the physical space being outside of the safe physical coordinates based on the location of the user device being outside of the safe physical coordinates within the physical space.

In some arrangements, the user device may detect a location change of the avatar 120 of the user 302 in the virtual environment 100 based on the virtual coordinates of the avatar 120. For example, an insecure location, having virtual coordinates within the virtual environment 100 defined as insecure virtual coordinates, may have been identified by the service computing system 320 to have an unprotected connection. The user device may detect the location of the avatar 120 of the user 302 in the virtual environment 100 being proximate to or within the insecure location based on the virtual coordinates of the avatar 120 being proximate to or within the insecure virtual coordinates. For example, the service computing system 320 may have set a pre-determined virtual radius having safe virtual coordinates within the virtual environment 100. The user device may detect the location of the avatar 120 of the user 302 in the virtual environment 100 being outside of the safe virtual coordinates based on the virtual coordinates of the avatar 120 being outside of the safe virtual coordinates within the virtual environment 100.

At 916, a microphone device of the user device may detect a voice command of the user 302. For example, the voice command of the user 302 may verbally request a freeze level (e.g., the level one freeze 706, the level two freeze 716, and the level three freeze 728) for the virtual asset 130. At 918, the user device may detect a location of the user 302 in the physical space, based on the location of the user device in the physical space, being proximate to a fraudulent user with a fraudulent history based on a blacklist (e.g., a list having identifiers of users with fraudulent history, etc.) stored within the asset control system 332 or the service computing system 320. The fraudulent user may have a fraudulent user device (e.g., the user device for the fraudulent user). The user device of the user 302 may detect a location of the fraudulent user in the physical space using a location of the fraudulent user device in the physical space. For example, the location of the fraudulent user in the physical space, having physical coordinates within the physical space defined as fraudulent physical coordinates, may have been identified by the service computing system 320. At 918, the user device of the user 302 may detect the location of the user 302 in the physical space being proximate to or within the fraudulent physical coordinates based on the location of the user device within the physical space being proximate to or within the fraudulent physical coordinates. In some arrangements, the physical space proximate to the fraudulent physical coordinates may be a room in a building, a building, a house, a neighborhood, a city, a state, a country, a continent, and so on, in the physical space. In some arrangements, the blacklist is stored in the asset control system 332 and is updated (e.g., maintained, etc.) by the service computing system 320 or multiple service computing systems 320.

In some arrangements, the user device may detect a location of the avatar 120 of the user 302 in the virtual environment 100, based on the virtual coordinates of the avatar 120 in the virtual environment 100, being proximate to a fraudulent avatar associated with the fraudulent user with the fraudulent history. The user device of the user 302 may detect a location of the fraudulent avatar in the virtual environment 100 using virtual coordinates of the fraudulent avatar in the virtual environment 100. For example, the location of the fraudulent avatar in the virtual environment 100, having virtual coordinates within the virtual environment 100 defined as fraudulent virtual coordinates, may have been identified by the service computing system 320. The user device of the user 302 may detect the location of the avatar 120 of the user 302 in the virtual environment 100 being proximate to or within the fraudulent virtual coordinates based on the virtual coordinates of the avatar 120 within the virtual environment 100 being proximate to or within the fraudulent virtual coordinates.

At 920, the asset control system 332 may detect a lack of access between the user 302 and the virtual asset 130 for a period of time. In some arrangements, the period of time may be two weeks (e.g., 14 days). In some arrangements, the period of time may be shorter than two weeks (e.g., one week, one day, etc.) or longer than two weeks (e.g., three weeks, one month, etc. At 922, the service computing system 320 may detect a change in market value of the virtual asset 130 that exceed a pre-determined threshold. In some arrangements, the pre-determined threshold is +/−10% of an original market value of the virtual asset 130. In some arrangements, the pre-determined threshold is +/−50% of the original market value of the virtual asset 130. It is to be appreciated that the detected actions 900 are examples and should not be considered as limiting the detected actions 900 to only what is shown in FIG. 9.

A first action time period is a period of time it takes for the detected actions of first triggers (e.g., the level one first trigger 704, the level two first trigger 714, and the level three first trigger 726) to be performed and completed. In some arrangements, the first action time period is negatively correlated with the freeze level (e.g., the level one freeze 706, the level two freeze 716, and the level three freeze 728). For example, the first action time period associated with the level one freeze 706 (e.g., for the level one first trigger 704) may be A minutes, the first action time period associated with the level two freeze 716 (e.g., for the level two first trigger 714) may be B minutes, and the first action time period associated with the level three freeze 728 (e.g., for the level three first trigger 726) may be C minutes, where A>B>C. In these arrangements, an increase in the freeze level may be associated with an increase in risk of the virtual asset 130 being lost or stolen, requiring a faster (e.g., quicker, etc.) first action time period. While values of A, B, and C are described in minutes, it is to be appreciated that values for A, B, and C may be of any time unit.

A non-first action time period is a period of time it takes for the detected actions of non-first triggers (e.g., the level one second trigger 708, the level two second trigger 718, the level two third trigger 720, the level two fourth trigger 722, the level three second trigger 730, the level three third trigger 732, and the level three fourth trigger 734) to be performed and completed. In some arrangements, the non-first action time period is positively correlated with the freeze level. For example, the non-first action time period associated with the level one freeze 706 (e.g., for the level one second trigger 708) may be D minutes, the non-first action time period associated with the level two freeze 716 (e.g., for the level two second trigger 718, the level two third trigger 720, and/or the level two fourth trigger 722) may be E minutes, and the non-first action time period associated with the level three freeze 728 (e.g., for the level three second trigger 730, the level three third trigger 732, and/or the level three fourth trigger 734) may be F minutes, where D<E<F. In these arrangements, increase in the non-first action time period (e.g., increase in friction, etc.) may reduce a risk of loss or theft of the virtual asset 130, reducing a risk of the virtual asset 130 being lost or stolen in response to being unfrozen. While values of D, E, and F are described in minutes, it is to be appreciated that values for D, E, and F may be of any time unit.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor that, in some arrangements, may execute instructions stored, or otherwise accessed, via different areas of memory). Alternatively or additionally, the one or more processors may be structured to perform or otherwise execute certain operations independent of one or more co-processors. In some arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some arrangements, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the arrangements described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by a service computing system from a user computing system, an asset freeze service request comprising an authentication token, the authentication token comprising a user identifier associated with a user and an asset identifier associated with a virtual asset;
   retrieving, by the service computing system from an asset control system, a recorded user identifier and a recorded asset identifier, wherein the recorded user identifier is associated with the recorded asset identifier;
   comparing, by the service computing system, the user identifier with the recorded user identifier, or the asset identifier with the recorded asset identifier;
   based on the user identifier matching the recorded user identifier, or the asset identifier matching the recorded asset identifier, generating, by the service computing system, a key associated with the virtual asset;
   sending, by the service computing system to the asset control system, the key and the asset freeze service request;
   wherein the asset control system receives the key and the asset freeze service request, and facilitating, by the asset control system, access of the virtual asset within a virtual environment by requiring the key to allow the access to the virtual asset,
wherein access to the virtual asset comprises at least one of reading or viewing the virtual asset, copying the virtual asset, at least one of writing or editing the virtual asset, and at least one of selling or transferring the virtual asset; and
generating and performing, by the service computing system, an asset freeze protocol configured to define access to the virtual asset, the asset freeze protocol comprising:
receiving, by the service computing system, a level one first trigger, wherein receiving the first level trigger comprises detecting an action relating to at least one of the virtual environment or the virtual asset, and
based on receiving the level one first trigger, securing, by the service computing system, the virtual asset under a level one freeze within the service computing system,
determining, by the service computing system, that the user initiates at least one of selling or transferring the virtual asset within the asset control system while the virtual asset is secured under the level one freeze; and
denying, by the service computing system, the at least one of selling or transferring the virtual asset by preventing providing the key to the asset control system.

2. The method of claim 1, wherein the detected action comprises at least one of:
a transfer, detected by the asset control system, in ownership of the virtual asset from the user to another user within the asset control system without providing the key to the asset control system;
a delayed possession, detected by the asset control system, of the virtual asset by the user within the asset control system;
a delayed transfer, detected by the asset control system, in ownership of the virtual asset from the user to another user within the asset control system;
a user signature, detected by the user device, comprising movement of the user;
a service provider signature, detected by the service provider device, comprising movement of a representative of a service provider associated with the service computing system;
a body gesture, detected by the user device, of the user;
a location change, detected by the user device, of the user based on a location change of the user device;
a voice command, detected by a microphone device of the user device, of the user;
a location of the user, detected by the user device, being proximate to a fraudulent user with a fraudulent history based on a blacklist within the asset control system;
a lack of access, detected by the asset control system, between the user and the virtual asset for a period of time; and
a change in a market value, detected by the service computing system, of the virtual asset that exceeds a pre-determined threshold.

3. The method of claim 1, wherein the user device comprises at least one of an augmented reality goggle, a virtual reality goggle, a phone, a tablet, a motion-tracking suit, a hologram system, or a haptic feedback olfactory device.

4. The method of claim 1, wherein the asset control system is at least one of a blockchain, a virtual wallet, a database, a server, or a network.

5. The method of claim 1, wherein the virtual asset comprises at least one of a Non-Fungible Token (NFT), cryptocurrency, a digital contract, a digital car title, a digital house title, a digital land title, or a virtual representation of a physical asset.

6. The method of claim 1, wherein the asset freeze protocol further comprises:
receiving, by the service computing system, a level one second trigger; and
based on receiving the level one second trigger, removing, by the service computing system, the virtual asset from under the level one freeze,
wherein the level one second trigger comprises the detected action relating to at least one of the virtual environment or the virtual asset.

7. The method of claim 1, wherein the asset freeze protocol further comprises:
receiving, by the service computing system, a level two first trigger;
based on receiving the level two first trigger, securing, by the service computing system, the virtual asset under a level two freeze within the service computing system;
receiving, by the service computing system, a level two second trigger;
based on receiving the level two second trigger, removing, by the service computing system, the virtual asset from under the level two freeze, and securing, by the service computing system, the virtual asset under the level one freeze within the service computing system;
receiving, by the service computing system, a level two third trigger; and
based on receiving the level two third trigger, removing, by the service computing system, the virtual asset from under the level one freeze,
wherein the level two first trigger, the level two second trigger, and the level two third trigger comprise the detected action relating to at least one of the virtual environment or the virtual asset, and
wherein at the level two freeze, the service computing system (i) prevents providing the key to the asset control system in response to determining that the user initiates to at least one of sell or transfer the virtual asset within the asset control system and (ii) provides the key to the asset control system in response to the user initiating:
at least one of read or view only a first portion of the virtual asset, copy only a second portion of the virtual asset, or
at least one of write or edit only a third portion of the virtual asset.

8. The method of claim 7, wherein the first portion of the virtual asset, the second portion of the virtual asset, and the third portion of the virtual asset are all same portions of the virtual asset.

9. The method of claim 7, wherein the first portion of the virtual asset, the second portion of the virtual asset, and the third portion of the virtual asset are all different portions of the virtual asset.

10. The method of claim 7, wherein the asset freeze protocol comprises:
receiving, by the service computing system, a level three first trigger;

based on receiving the level three first trigger, securing, by the service computing system, the virtual asset under a level three freeze within the service computing system;

receiving, by the service computing system, a level three second trigger;

based on receiving the level three second trigger, removing, by the service computing system, the virtual asset from under the level three freeze, and securing, by the service computing system, the virtual asset under the level two freeze within the service computing system;

receiving, by the service computing system, a level three third trigger;

based on receiving the level three third trigger, removing, by the service computing system, the virtual asset from under the level two freeze, and securing, by the service computing system, the virtual asset under the level one freeze within the service computing system;

receiving, by the service computing system, a level three fourth trigger; and based on receiving the level three fourth trigger, removing, by the service computing system, the virtual asset from under the level one freeze, wherein the level three first trigger, the level three second trigger, the level three third trigger, and the level three fourth trigger comprise the detected action relating to at least one of the virtual environment or the virtual asset, and wherein at the level three freeze, the service computing system prevents providing the key to the asset control system in response to the user initiating:
at least one of reading or viewing the virtual asset, copying the virtual asset,
at least one of writing or editing the virtual asset, or
at least one of selling or transferring the virtual asset.

11. The method of claim 1, further comprising:
sending, by the service computing system to the user computing system, the asset freeze protocol;
receiving, by the service computing system from the user computing system, a modification request requesting modification of the asset freeze protocol, the modification request comprising at least one of an additional trigger or an additional freeze level; and
based on receiving the modification request, modifying, by the service computing system, the asset freeze protocol according to the modification request.

12. The method of claim 1, further comprising:
generating, by the service computing system, a user score of the user based on at least one of an age of the user, a gender of the user, a credit score of the user, a house address of the user, a business address of the user, an occupation of the user, or a household income of the user;
generating, by the service computing system, an asset score of the virtual asset based on a market value of the virtual asset, a storage medium used by the user to store the virtual asset, a social media popularity of the virtual asset, a benefit of owning the virtual asset, a privilege of owning the virtual asset, or a feature of owning the virtual asset;
based on the user score and the asset score, generating, by the service computing system, a preliminary asset freeze protocol;
comparing, by the service computing system, the preliminary asset freeze protocol to other asset freeze protocols, wherein the other asset freeze protocols correspond to (i) other users associated with other user scores equal to the user score, and (ii) other assets associated with other asset scores equal to the asset score; and
based on the preliminary asset freeze protocol matching other asset freeze protocols, transforming, by the service computing system, the preliminary asset freeze protocol into the asset freeze protocol.

13. The method of claim 12, wherein the other user scores are associated with the other asset scores.

14. A system, comprising:
a user computing system comprising a first processor configured to:
send, to a service computing system, an asset freeze service request comprising an authentication token, the authentication token comprising a user identifier associated with a user and an asset identifier associated with a virtual asset;
the service computing system comprising a second processor configured to:
retrieve, from an asset control system, a recorded user identifier and a recorded asset identifier, wherein the recorded user identifier is associated with the recorded asset identifier,
compare the user identifier with the recorded user identifier, or the asset identifier with the recorded asset identifier,
based on the user identifier matching the recorded user identifier, or the asset identifier matching the recorded asset identifier, generate a key associated with the virtual asset,
send, to the asset control system, the key and the asset freeze service request, and
generate and perform an asset freeze protocol configured to define access to the virtual asset, the asset freeze protocol comprising:
receiving, by the service computing system, a level one first trigger, wherein receiving the first level trigger comprises detecting an action relating to at least one of the virtual environment or the virtual asset, and
based on receiving the level one first trigger, securing, by the service computing system, the virtual asset under a level one freeze within the service computing system,
determine that the user initiates at least one of sell or transfer the virtual asset within the asset control system while the virtual asset is secured under the level one freeze, and
deny the at least one of selling or transferring the virtual asset by preventing providing the key to the asset control system; and
the asset control system comprising a third processor configured to:
receive the key and the asset freeze service request from the service computing system, and
facilitate access of the virtual asset within a virtual environment by requiring the key to allow access to the virtual asset, wherein access to the virtual asset comprises at least one of reading or viewing the virtual asset, copying the virtual asset, at least one of writing or editing the virtual asset, and at least one of selling or transferring the virtual asset.

15. The system of claim 14, wherein the detected action comprises at least one of:
a transfer, detected by the asset control system, in ownership of the virtual asset from the user to another user within the asset control system without providing the key to the asset control system;

a delayed possession, detected by the asset control system, of the virtual asset by the user within the asset control system;
a delayed transfer, detected by the asset control system, in ownership of the virtual asset from the user to another user within the asset control system;
a user signature, detected by the user device, comprising movement of the user;
a service provider signature, detected by the service provider device, comprising movement of a representative of a service provider associated with the service computing system;
a body gesture, detected by the user device, of the user;
a location change, detected by the user device, of the user based on a location change of the user device;
a voice command, detected by a microphone device of the user device, of the user;
a location of the user, detected by the user device, being proximate to a fraudulent user with a fraudulent history based on a blacklist within the asset control system;
a lack of access, detected by the asset control system, between the user and the virtual asset for a period of time; and
a change in a market value, detected by the service computing system, of the virtual asset that exceeds a pre-determined threshold.

16. The system of claim 14, wherein the user device comprises at least one of an augmented reality goggle, a virtual reality goggle, a phone, a tablet, a motion-tracking suit, a hologram system, or a haptic feedback olfactory device.

17. The system of claim 14, wherein the asset control system is at least one of a blockchain, a virtual wallet, a database, a server, or a network.

18. The system of claim 14, wherein the virtual asset comprises at least one of a Non-Fungible Token (NFT), cryptocurrency, a digital contract, a digital car title, a digital house title, a digital land title, or a virtual representation of a physical asset.

19. The system of claim 14, wherein the asset freeze protocol further comprises:
receiving, by the service computing system, a level one second trigger; and
based on receiving the level one second trigger, removing, by the service computing system, the virtual asset from under the level one freeze, wherein the level one second trigger comprises the detected action relating to at least one of the virtual environment or the virtual asset.

20. A system comprising:
at least one non-transitory computer-readable storage media storing instructions that, when executed by one or more first processors to perform operations comprising:
receiving, from a user computing system, an asset freeze service request comprising an authentication token, the authentication token comprising a user identifier associated with a user and an asset identifier associated with a virtual asset;
retrieving, from an asset control system, a recorded user identifier and a recorded asset identifier, wherein the recorded user identifier is associated with the recorded asset identifier;
comparing the user identifier with the recorded user identifier, or the asset identifier with the recorded asset identifier;
based on the user identifier matching the recorded user identifier, or the asset identifier matching the recorded asset identifier, generating a key associated with the virtual asset;
sending, to the asset control system, the key and the asset freeze service request; and
generating and performing an asset freeze protocol configured to define access to the virtual asset, the asset freeze protocol comprising:
receiving a level one first trigger, wherein receiving the first level trigger comprises detecting an action relating to at least one of the virtual environment or the virtual asset, and
based on receiving the level one first trigger, securing the virtual asset under a level one freeze within the service computing system,
determining that the user initiates at least one of sell or transfer the virtual asset within the asset control system while the virtual asset is secured under the level one freeze, and
denying the at least one of selling or transferring the virtual asset by preventing providing the key to the asset control system; and
wherein the at least one non-transitory computer-readable storage media further stores instructions that are executed by one or more second processors to perform operations comprising:
receiving the key and the asset freeze service request, and
facilitating access of the virtual asset within a virtual environment by requiring the key to allow access to the virtual asset, and wherein access to the virtual asset comprises at least one of reading or viewing the virtual asset, copying the virtual asset, at least one of writing or editing the virtual asset, and at least one of selling or transferring the virtual asset.

* * * * *